United States Patent
Hosotani et al.

[11] Patent Number: 6,014,955
[45] Date of Patent: Jan. 18, 2000

[54] CONTROL APPARATUS FOR INTERNAL COMBUSTION ENGINE USING AIR-AMOUNT-FIRST FUEL-AMOUNT-SECOND CONTROL METHOD

[75] Inventors: Ichiro Hosotani, Numazu; Hiroshi Tanaka; Naohide Fuwa, both of Susono; Iwao Maeda, Mishima; Shigeo Kikori, Toyota; Ken Kuretake, Susono, all of Japan

[73] Assignee: Toyota Jidosha Kabushiki Kaisha, Aichi, Japan

[21] Appl. No.: 08/932,541

[22] Filed: Sep. 17, 1997

[30] Foreign Application Priority Data

Sep. 19, 1996 [JP] Japan ..................... 8-247952
Dec. 6, 1996 [JP] Japan ..................... 8-326965

[51] Int. Cl.$^7$ ............... F02D 41/34; F02D 11/10
[52] U.S. Cl. ........................... 123/399; 123/478
[58] Field of Search ................ 123/478, 399, 123/492, 480

[56] References Cited

U.S. PATENT DOCUMENTS

| | | | |
|---|---|---|---|
| 4,527,529 | 7/1985 | Suzuki et al. | 123/478 |
| 4,552,116 | 11/1985 | Kuroiwa et al. | 123/489 |
| 4,727,838 | 3/1988 | Oshiage et al. | 123/361 |
| 4,911,131 | 3/1990 | Nakaniwa et al. | 123/492 |
| 5,095,874 | 3/1992 | Schnaibel et al. | 123/361 |
| 5,137,000 | 8/1992 | Stepper et al. | 123/478 |
| 5,383,431 | 1/1995 | Nishimura et al. | 123/399 |
| 5,396,869 | 3/1995 | Suzuki et al. | 123/399 |

FOREIGN PATENT DOCUMENTS 7-33781 4/1995 Japan.

*Primary Examiner*—Andrew M. Dolinar
*Assistant Examiner*—Mahmoud M. Gimie
*Attorney, Agent, or Firm*—Finnegan, Henderson, Farabow, Garrett & Dunner

[57] ABSTRACT

An air-amount-first fuel-amount-second control apparatus for an internal combustion engine having an electronically-controlled throttle valve. The response characteristic of the throttle valve is stored, a target value of the throttle valve opening degree corresponding to the operating position of the accelerator pedal is calculated, the intake air valve closing time of the fuel injection cylinder is calculated in accordance with the engine operating condition, the time required for reaching a target throttle valve opening degree is calculated from the target throttle valve opening degree and the stored value of the response characteristic of the throttle valve, the throttle valve opening degree as of the intake air valve closing time is calculated from the calculated time required for reaching the target throttle valve opening degree and the intake air valve closing time of the fuel injection cylinder. A fuel supply amount constituting a target air-fuel ratio is calculated from the target air-fuel ratio and the intake air amount corresponding to the throttle valve opening degree as of the intake air valve closing time, and the fuel in the calculated amount is supplied to the engine fuel injection cylinder.

7 Claims, 17 Drawing Sheets

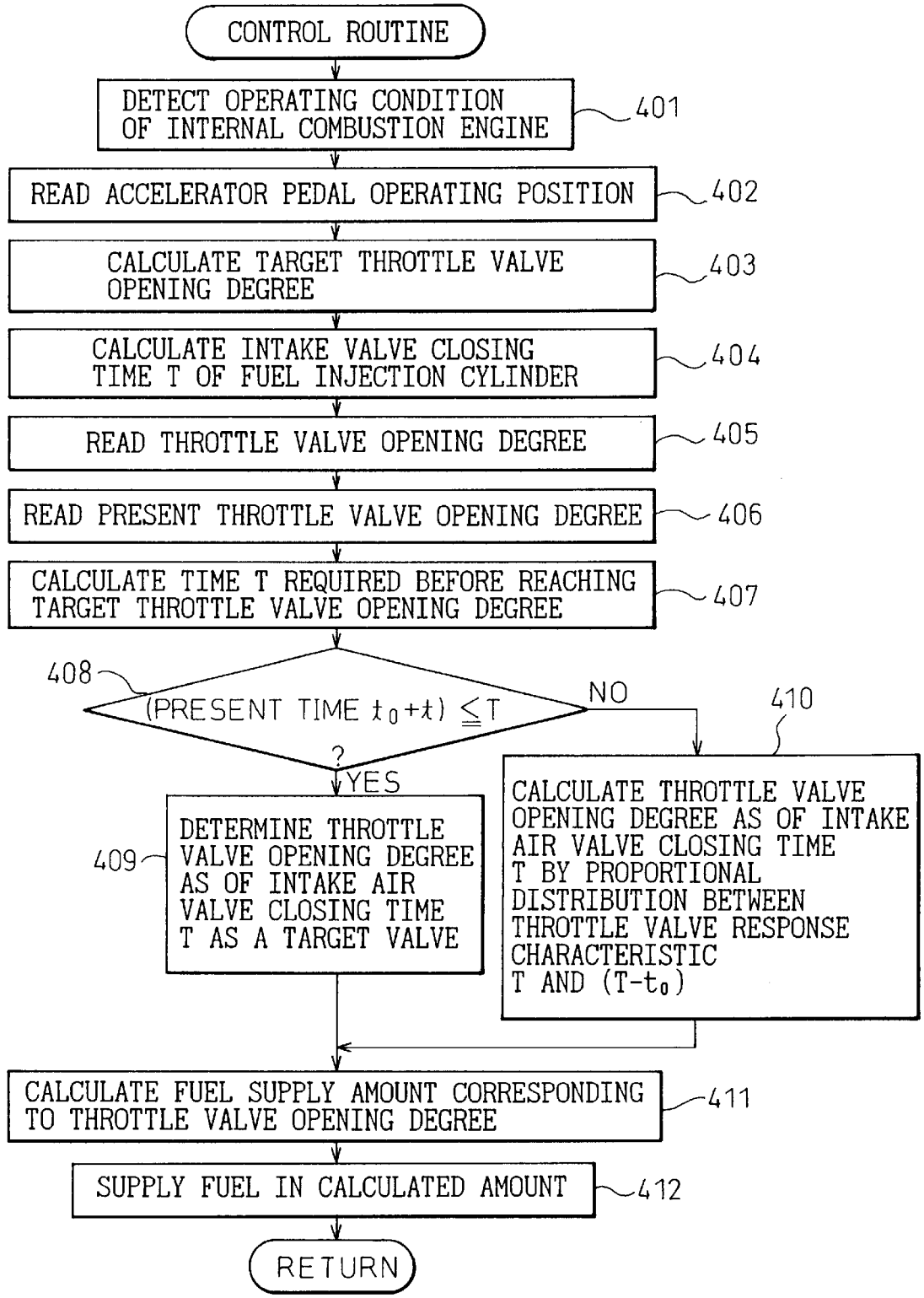

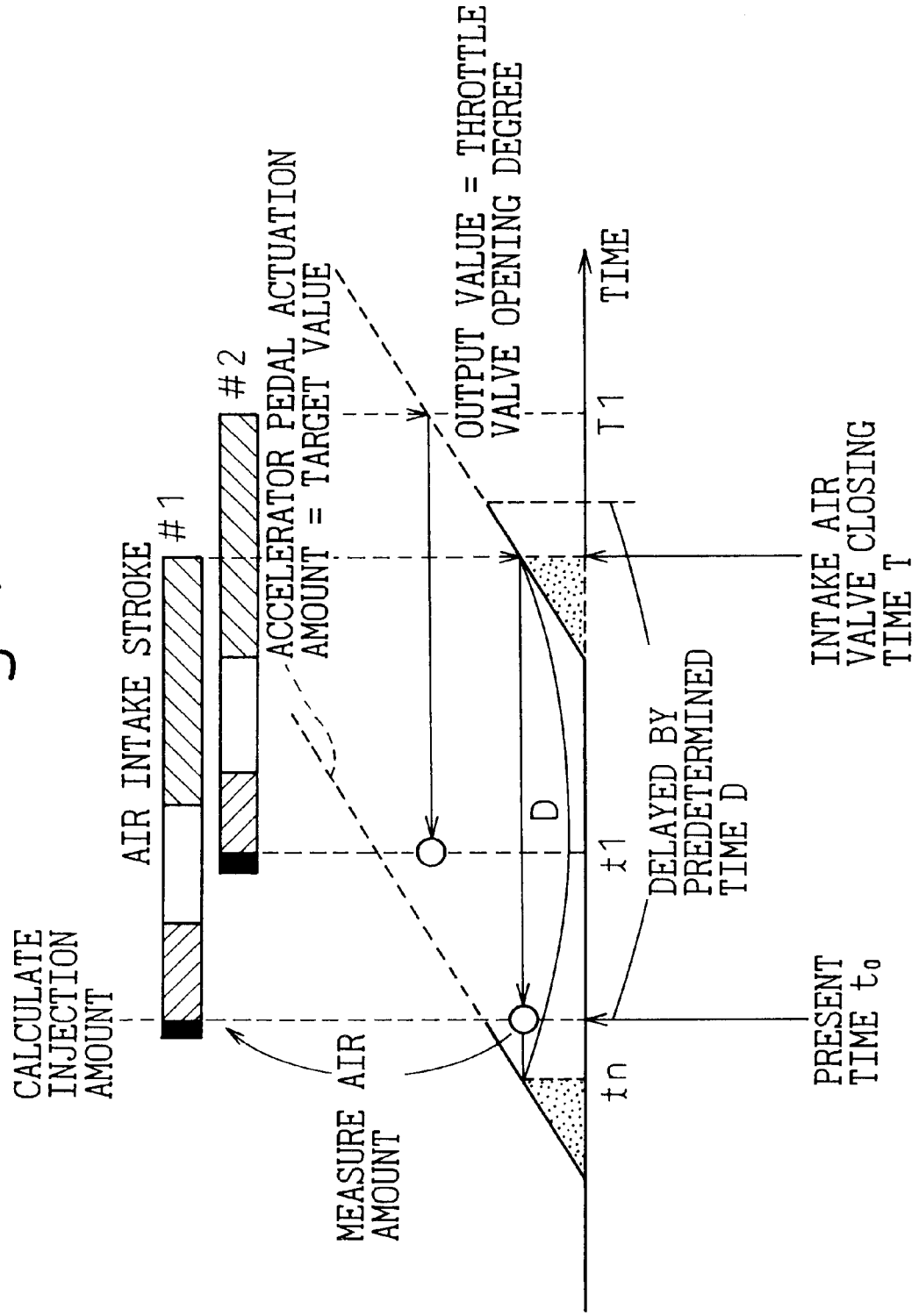

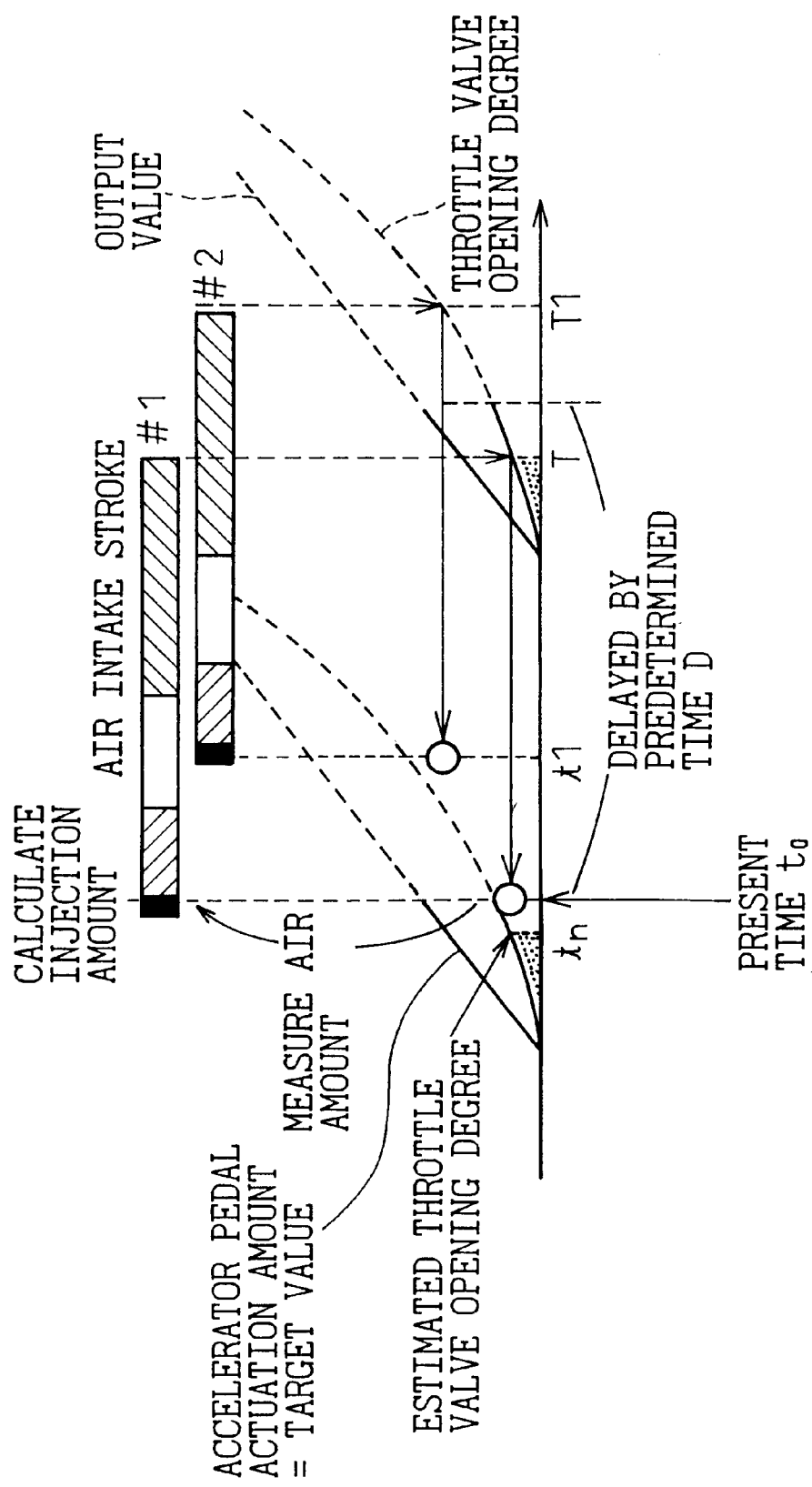

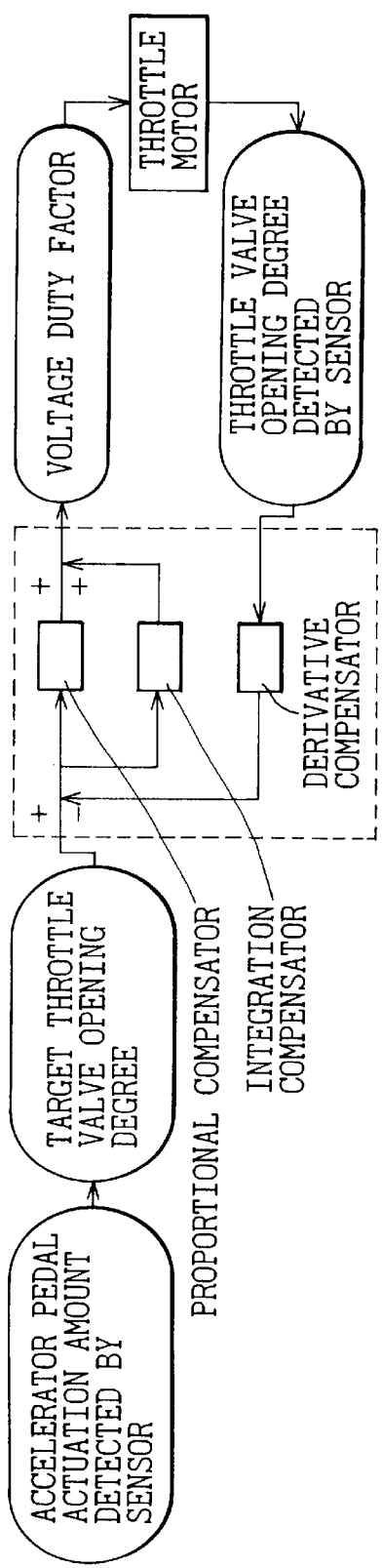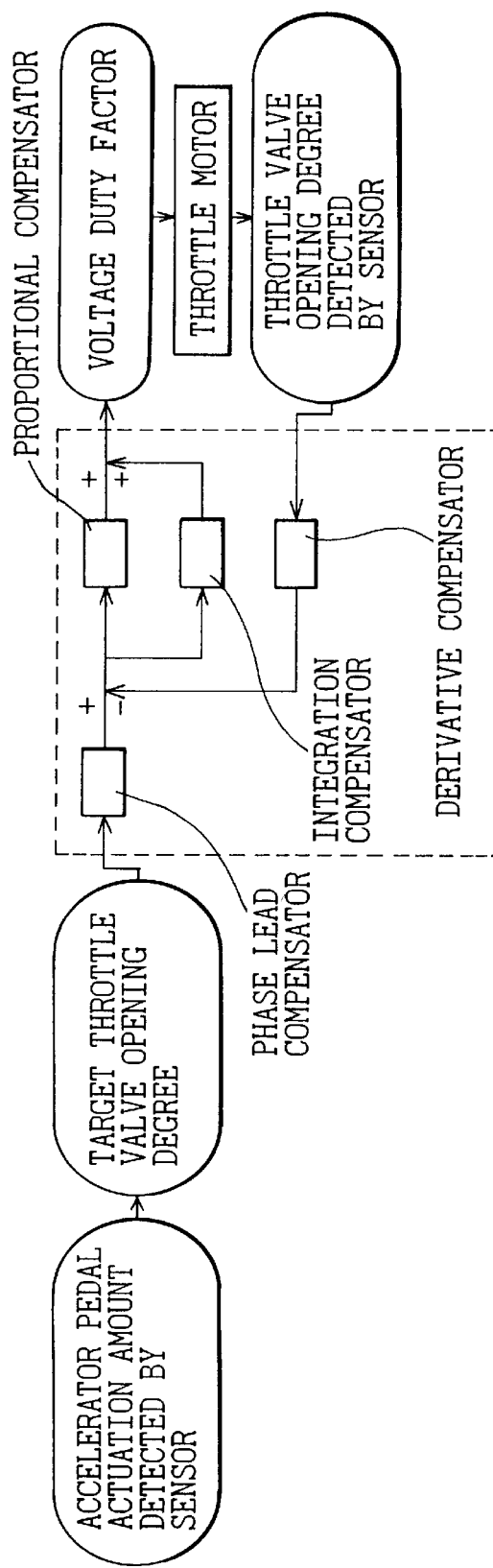
Fig.8A
Fig.8B

US 6,014,955

CONTROL APPARATUS FOR INTERNAL COMBUSTION ENGINE USING AIR-AMOUNT-FIRST FUEL-AMOUNT-SECOND CONTROL METHOD

BACKGROUND OF THE INVENTION

1. Field of the Invention

The present invention relates to a control apparatus for an internal combustion engine or, in particular, to a control apparatus for an internal combustion engine including an electronically controlled throttle valve in which the air-fuel ratio is controlled by the intake air amount followed by the fuel supply amount.

2. Description of the Related Art

In a conventional internal combustion engine of electronically-controlled fuel injection type, the intake air amount is measured and the fuel injection amount conforming with the intake air amount thus measured is calculated thereby to adjust the air-fuel ratio. This method of adjusting the air-fuel ratio is based on the concept that the intake air amount is determined according to the amount of actuation of the accelerator pedal. As a result, at the time of engine acceleration or deceleration when the intake air amount undergoes a considerable change, the problem is posed that an error is liable to develop in the intake air amount measured by the computer for controlling the engine.

In view of this, an engine control apparatus of fuel-amount-first air-amount-second control type is disclosed in JP-B-7-33781 using an electronically controlled throttle valve controlled by an electric actuator in accordance with the amount of actuation of the accelerator pedal, in which the amount of fuel injected (fuel injection amount) is determined first and then the intake air amount.

In the engine control apparatus according to JP-B-7-33781 of an engine of fuel-amount-first air-amount-second control type for controlling adjusting the fuel supply amount and the throttle valve opening degree in accordance with the accelerator pedal operating position, a technique is disclosed in which a predetermined delay time before fuel is actually taken into the cylinder is set in controlling the throttle valve opening degree to control the fuel supply amount in accordance with the engine rotational speed and the operating position of the accelerator pedal.

By setting a delay time in this way, the time before the injected fuel is actually taken into the cylinder is taken into consideration so that the fuel amount and the intake air amount in the cylinder are controlled accurately.

In view of the fact that the engine operating condition actually changes frequently and the calculated delay time is varied with the engine rotational speed or the fuel injection amount, however, the engine control apparatus disclosed in JP-B-7-33781 poses the problem that the throttle valve sometimes cannot respond to such a change, especially at the time of sudden operation of the accelerator pedal. It is thus difficult to control the throttle valve opening degree to a target value based on each throttle valve opening degree, thereby making it impossible to always determine an accurate air-fuel ratio.

SUMMARY OF THE INVENTION

A first object of the present invention is to provide a control apparatus for an internal combustion engine employing an air-amount-first fuel-amount-second control method for controlling the air-fuel ratio by determining the intake air amount first and then the fuel supply amount, in which the fuel supply timing is adjusted to the actual delay of the control value behind a target throttle valve opening degree inherently existing in an electronically-controlled throttle valve unit or to the control delay positively set with respect to a target throttle valve opening degree, thereby making it possible to always determine an accurate air-fuel ratio.

A second object of the invention is to provide a control apparatus for an internal combustion engine employing an air-amount-first fuel-amount-second control method for controlling the air-fuel ratio by determining the intake air amount first and then the fuel supply amount, in which, in view of the actual delay of the control value with respect to a target throttle valve opening degree inherently existing in an electronically-controlled throttle valve unit, a control delay with respect to the target throttle valve opening degree is positively set and the fuel supply timing is adjusted in accordance with this delay, thereby always determining an accurate air-fuel ratio.

In order to achieve the first object of the invention, according to a first aspect of the invention, there is provided a control apparatus for an internal combustion engine employing an air-amount-first fuel-amount-second control method for Controlling the throttle valve opening degree and the fuel supply amount in accordance with the operating position of the accelerator pedal, comprising a means for driving the throttle valve, a means for calculating a target value of the throttle valve opening degree, a means for storing the response characteristic of the throttle valve, a means for calculating the timing of closing the intake air valve, a means for calculating the time required for reaching a target value of the throttle valve opening degree, a means for calculating the throttle valve opening degree at the timing of closing the intake air valve, a means for calculating the fuel supply amount from the target air-fuel ratio and the intake air amount at the time of closing the intake air valve, and a means for supplying the fuel.

In order to achieve the first object of the invention, according to a second aspect of the invention, there is provided a control apparatus for an internal combustion engine employing the air-amount-first fuel-amount-second control method for controlling the throttle valve opening degree and the fuel supply amount in accordance with the operating position of the accelerator pedal, comprising a means for calculating a target value of the throttle valve opening degree, a means for storing the target value of the throttle valve opening degree, a means for producing a throttle valve opening degree control value, a means for driving the throttle valve, a means for calculating the timing of closing the intake air valve, a means for calculating the throttle valve opening degree at the time of closing the intake air valve, a means for calculating the fuel supply amount from the target air-fuel ratio and the intake air amount corresponding to the throttle valve opening degree at the time of closing the intake air valve, and a fuel supply means.

The control apparatus for an internal combustion engine according to the second aspect of the invention can further comprise a means for compensating for the phase lead of the throttle valve opening degree control value in order to compensate for the mechanical delay of the throttle valve with respect to the control value.

Also, the control apparatus for an internal combustion engine according to the first or second aspect can further comprise a integral compensation means for compensating for the target value of the throttle opening degree in integral fashion.

In order to achieve the above-mentioned second object, according to a third aspect of the invention, there is provided a control apparatus for an internal combustion engine employing an air-amount-first fuel-amount-second control method for controlling the throttle valve opening degree and the fuel supply amount in accordance with the operating position of the accelerator pedal, comprising a means for calculating a target value of the throttle valve opening degree, a means for storing the throttle valve opening degree target value, a means for outputting a throttle valve opening degree control value, a means for driving the throttle valve, a means for calculating the timing of closing the intake air valve, a first throttle valve opening degree calculation means for calculating the throttle valve opening degree at the time of closing the intake air valve in the case where the throttle valve opening degree target value is stored for a longer time than the timing of closing the intake air valve, a second throttle valve opening degree calculation means for calculating the throttle valve opening degree at the time of closing the intake air valve in the case where the time for storing the target throttle valve opening degree is shorter than the intake air valve opening timing, a fuel supply amount calculation means for calculating the amount of supplied fuel from the target air-fuel ratio and the intake air amount corresponding to the throttle valve opening degree at the intake air valve closing timing, and a fuel supply means.

The control apparatus for an internal combustion engine according to the first aspect of the invention comprises a means for storing the response characteristic before the throttle valve reaches a predetermined target opening degree in response to an input signal with a predetermined target opening degree set therein, a means for calculating a target value of the throttle valve opening degree in accordance with the operating position of the accelerator pedal, a means for calculating the intake air valve opening timing of the fuel injection cylinder in accordance with the operating condition of the internal combustion engine, a means for calculating the time required for the throttle valve opening degree to reach the target value from the throttle valve opening degree target value and the response characteristic of the throttle valve, a means for calculating the throttle valve opening degree at the intake air valve closing timing from the calculated time before reaching the target value of the throttle valve and the intake air opening timing, a means for calculating a fuel supply amount constituting a target air-fuel ratio from the target air-fuel ratio and the intake air amount corresponding to the throttle valve opening degree at the timing of closing the intake air valve, and a means for supplying the fuel in the calculated amount.

The control apparatus for an internal combustion engine according to the second aspect of the invention comprises a means for calculating a target value of the throttle valve opening degree in accordance with the operating position of the accelerator pedal, a means for storing the calculated target value of the throttle valve opening degree for a predetermined time, a means for outputting the stored target value of the throttle valve opening degree as a throttle valve opening degree control value after the lapse of the predetermined time, a means for calculating the timing of closing the intake air valve in accordance with the operating condition of the engine, a means for calculating the throttle valve opening degree at the time of closing the intake air valve from the stored target value of the throttle valve opening degree and the timing of closing the intake air valve of the fuel injection cylinder, a means for calculating the fuel supply amount constituting a target air-fuel ratio from the target air-fuel ratio and the intake air amount corresponding to the throttle valve opening degree at the time of closing the intake air valve, and a means for supplying the fuel in the amount calculated.

The control apparatus for an internal combustion engine according to the third aspect of the invention comprises a means for calculating a target value of the throttle valve opening degree in accordance with the operating position of the accelerator pedal, a means for storing the calculated target value of the throttle valve opening degree for a predetermined time, a means for outputting the stored target value of the throttle valve opening degree after the lapse of the predetermined time as a throttle valve opening degree control value, a means for calculating the timing of closing the intake air valve in accordance with the operating condition of the engine, a means for calculating the throttle valve opening degree at the timing of closing the intake air valve from the stored target value of the throttle valve opening degree and the timing of closing the intake air valve of the fuel injection cylinder, a means for calculating the throttle valve opening degree at the time of closing the intake air valve of the fuel injection cylinder from the change in the target value of the throttle valve opening degree during the predetermined time, a means for calculating the fuel supply amount from the target air-fuel ratio and the intake air amount corresponding to the throttle valve opening degree at the time of closing the intake air valve, and a means for supplying the fuel in the amount calculated.

BRIEF DESCRIPTION OF THE DRAWINGS

The present invention will be more clearly understood from the description as set forth below with reference to the accompanying drawings, wherein:

FIG. 2 is a flowchart showing an example of control steps in a control apparatus for an internal combustion engine in the first aspect of the invention;

FIG. 4 is a diagram for explaining the relation between the accelerator pedal actuation amount, throttle valve opening degree and the timing of closing the intake valve with respect to the lapse of time in the control steps of FIGS. 3A and 3B;

FIG. 6 is a diagram for explaining the relation between the accelerator pedal actuation amount, throttle valve opening degree and the timing of closing the intake valve with respect to the lapse of time in the control steps of FIG. 5;

FIG. 8A is a function diagram showing the steps of PID control in which the control value of the throttle valve opening degree is not compensated for;

FIG. 8B is a function diagram showing the steps of PID control in which the control value of the throttle valve opening degree is compensated for;

FIG. 9 is a function diagram showing the steps of PID control in which the target throttle valve opening degree used for calculation of the fuel injection amount is compensated for;

DESCRIPTION OF THE PREFERRED EMBODIMENTS

Embodiments of the present invention will be described in detail below with reference to the accompanying drawings.

Figure 1:
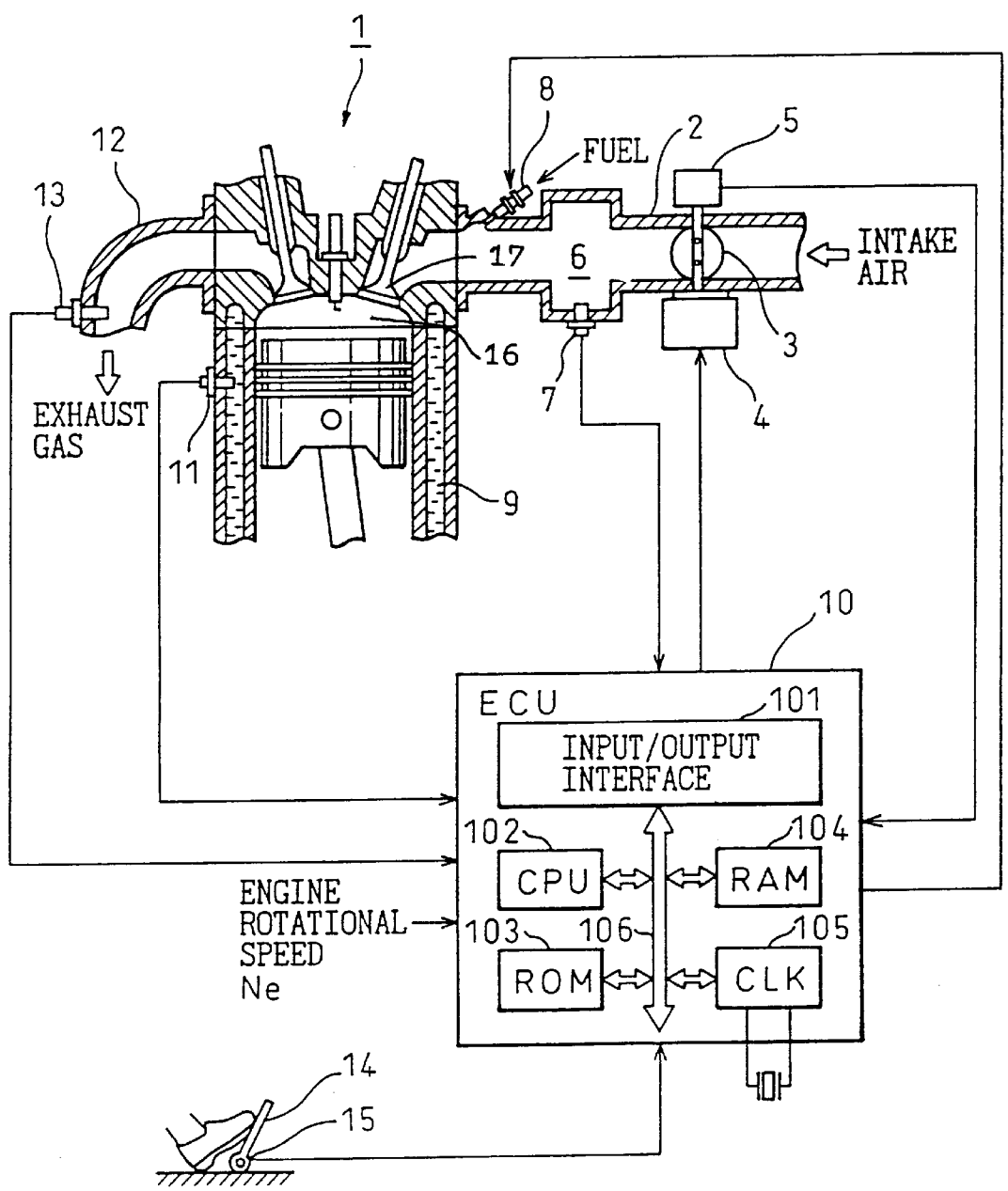
FIG. 1 is a diagram showing an overall configuration of a control apparatus for an internal combustion engine according to an embodiment of the present invention.

FIG. 1 schematically shows a multi-cylinder internal combustion engine 1 of an electronically-controlled fuel injection type comprising a control apparatus according to an embodiment of the present invention. In FIG. 1, an intake air path 2 of the internal combustion engine 1 has a throttle valve 3 arranged downstream of an air cleaner not shown. An actuator 4 for driving the throttle valve 4 is arranged at an axial end of this throttle valve 3, and a sensor 5 for detecting the opening degree of the throttle valve 3 is arranged at the other end thereof. Specifically, the throttle valve 3 according to this embodiment is an electronically-controlled throttle valve opened and closed by the actuator 4.

A surge tank 6 is arranged in the intake air path 2 downstream of the throttle valve 3. The surge tank 6 has arranged therein a pressure sensor 7 for detecting the pressure of the intake air. Further, a fuel injection valve 8 for supplying the pressured fuel to the intake air port from the fuel supply system for each cylinder is arranged downstream of the surge tank 6. The output of the throttle valve opening degree sensor 5 and the output of the pressure sensor 7 are applied to an ECU (engine control unit) 10 having a built-in microcomputer.

The engine 1 is depicted as having a combustion chamber 16, also referred to herein and in the appended claims as a fuel injection cylinder, to which fuel and air are supplied though an intake air valve 17. The intake air valve 17 opens and closes with operation of the engine 1 in a manner well known in the fuel injected engine art.

Also, a water temperature sensor 11 for detecting the temperature of cooling water is arranged in the cooling water path 9 of the cylinder block of the internal combustion engine 1. The water temperature sensor 11 generates an electrical signal of an analog voltage corresponding to the temperature of the cooling water. An exhaust gas path 12 has arranged therein a three-way catalyst converter (not shown) for purifying the three obnoxious components HC, CO and NOx in the exhaust gas at the same time. An O2 sensor 13 which is a kind of air-fuel ratio sensor is arranged in the exhaust gas path 12 upstream of the catalyst converter. The O2 sensor 13 generates an electrical signal corresponding to the concentration of the oxygen component in the exhaust gas. The outputs of the water temperature sensor 11 and the O2 sensor 13 are applied to the ECU 10.

Further, the ECU 10 is supplied with an accelerator pedal actuation amount signal from an accelerator pedal actuation amount sensor 15 mounted on an accelerator pedal 14 and an engine rotational speed Ne from a crank angle sensor mounted on a distributor not shown.

In the above-mentioned configuration, when a key switch not shown is turned on, the ECU 10 is energized to start a program and retrieve the outputs of the sensors, thereby controlling the actuator 4 for operating the throttle valve 3, the fuel injection valve 8 or the other actuators. The ECU 10 includes an A/D converter for converting the analog signals from the various sensors into digital signals, an input/output interface 101 for receiving input digital signals from the various sensors and producing and receiving signals for driving the actuators, a CPU 102 for performing arithmetic calculations, memories such as a ROM 103 and a RAM 104, and a clock 105. These component elements are connected to each other by a bus 106. The configuration of the ECU 10 is well known and will not be described further.

In a control apparatus for an internal combustion engine according to the first aspect cf the invention configured as described above, the opening degree of the throttle valve 3 at the time of closing the intake air valve of the fuel injection cylinder is predicted in accordance with the amount of actuation of the accelerator pedal, and the fuel is injected in accordance with the predicted opening degree thereby to control the air-fuel ratio in a manner conforming with the operating condition of the engine. The opening degree of the throttle valve 3 at the time of closing the intake air valve of the fuel injection cylinder is predicted in accordance with the amount of actuation of the accelerator pedal by reason of the fact that the opening degree of the throttle valve 3 is mechanically delayed behind the actuation of the accelerator pedal. In an electronically-controlled throttle valve unit, the actuation amount (depressed amount) of the accelerator pedal is A/D converted in the ECU 10, and by thus ascertaining the intention of the driver, a target opening degree is supplied to the actuator (motor) 4 by various control operations thereby to control the operation of the electronically-controlled throttle valve 3. A target opening degree of the electronically-controlled throttle valve is predetermined in this way. It is therefore possible to predict the response of the motor in accordance with the drive control and the drive system of the motor, i.e., to predict the opening degree of the throttle valve at the time of closing the intake air valve from the inverse model of the motor.

In the case where the motor is a step motor, the future step change time can be determined, and the position of the motor (the opening decree of the throttle valve) is counted in the ECU 10. Therefore, the time is known in advance for all steps. The step position nearest to the time of closing the intake air valve is thus read. In the case where the motor is a DC motor, on the other hand, the throttle valve opening degree at the time of closing the intake air valve is determined from the throttle valve speed under normal control operation though depending on the method of control. In the deceleration drive region (as far as the deviation from the target value is not less than a predetermined value), the deceleration look-up table is referenced to determine the throttle valve opening degree.

As a simple inverse model, the time before the intake air valve is closed is determined by calculations, and then, the time before the throttle valve 3 reaches the target opening degree is determined from the target opening degree of the throttle valve 3 and the present opening degree thereof. The time before the throttle valve 3 reaches the target opening degree is compared with the time before the intake air valve is closed. In the case where the time before the throttle valve 3 reaches the target opening degree is earlier than the time before the intake air valve is closed, the opening degree of the throttle valve 3 at the time when the intake air valve is closed constitutes a target opening degree. If the time before reaching the target opening degree of the throttle valve 3 is later than the time when the intake air valve is closed, in contrast, the opening degree of the throttle valve 3 at the time when the intake air valve is closed can be determined from the opening degree characteristic of the throttle valve 3 on the basis of the proportional distribution between the time before reaching the target opening degree of the throttle valve 3 and the time when the intake air valve is closed. Once the opening degree of the throttle valve 3 at the time when the intake air valve is closed is predicted in this way, the well-known throttle opening degree asynchronous injection control in which the fuel amount is increased in accordance with the motion of the throttle valve or the feedforward control based on the throttle valve opening degree is used to avoid the deterioration of the air-fuel ratio in the cylinder and thereby to produce an efficient emission effect.

An example of the process for controlling the air-fuel ratio described above will be explained with reference to the flowchart shown in FIG. 2. This control routine is executed for each predetermined crank angle.

First, step 401 detects the operating condition of the internal combustion engine 1. This detection of the engine operating condition can be carried out by the ECU 10 retrieving the various operating condition parameters such as the engine rotational speed Ne, the intake air pressure P, the accelerator pedal actuation amount (operating position) from the various sensors. Step 402 reads the present operating position of the accelerator pedal. Step 403 calculates a target value of the throttle valve opening degree from the operating position of the accelerator pedal.

Step 404 calculates the intake air valve closing time T of the injection cylinder from the engine operating condition detected in step 401. Step 405 reads the response characteristic of the throttle valve with respect to the opening position of the accelerator pedal stored beforehand in a memory (ROM 103) of the ECU 10. Step 406 reads the present opening degree of the throttle valve 3, followed by step 406 for calculating the time t required before the opening degree of the throttle valve 3 reaches a target value corresponding to the operating position of the accelerator pedal.

After calculating the time t before reaching the target value of the throttle valve opening degree in this way, step 408 judges whether the time when the throttle valve opening degree reaches the target value is earlier or later than the closing time T of the intake air valve. The time when the throttle valve opening degree reaches the target value can be determined by adding the time t required for reaching the target opening degree of the throttle valve 3 corresponding to the operating position of the accelerator pedal to the present time t0. Step 408 thus judges whether $(t0+t) \leq T$.

In the case where step 408 judges that $(t0+t) \leq T$. it indicates that the time when the throttle valve 3 reaches the target value is earlier than the intake valve closing time T. Then the process proceeds to step 409 where the opening degree of the throttle valve 3 at the time when the intake air valves closes is determined as the target opening degree of the throttle valve. In the case where $(t0+t) > T$, on the other hand, it means that the time when the throttle valve 3 reaches the target opening degree is later than the time T when the intake air valve closes. Thus the process proceeds to step 410. In step 410, the opening degree of the throttle valve 3 at the time T when the intake air valve closes is determined from the opening degree characteristic of the throttle valve 3 by the proportional distribution between the time t when the throttle valve 3 reaches the target opening degree and the time (T–t0) required before the intake air valve is closed.

After calculating the opening degree of the throttle valve 3 at the time T when the intake air valve closes in this way, step 411 determines a fuel supply amount constituting a target air-fuel ratio corresponding to the opening degree from the engine operating condition. The fuel in the amount thus calculated is injected from the fuel injection valve 8 in step 412 thereby to complete this routine. This control operation avoids the deterioration of the air-fuel ratio in the cylinder and reduces air-polluting emissions.

Now, the control operation of the control apparatus for an internal combustion engine according to the second aspect of the invention configured as shown in FIG. 1 will be explained. In the second aspect, the opening degree of the electronically-controlled throttle valve with respect to the actuation amount of the accelerator pedal is stored and the output thereof held for a predetermined time. After the lapse of the predetermined time, the particular output is applied to the actuator of the electronically-controlled throttle valve. The transmission of the present actuation amount of the accelerator pedal to the actuator of the electronically-controlled throttle valve, therefore, is intentionally delayed for a predetermined small amount of time, so that the throttle valve operation with respect to the actuation amount of the accelerator pedal is delayed by the particular predetermined length of time.

In the second aspect, the next closing time of the intake air valve of the fuel injection cylinder is calculated while the above-mentioned output is held. The time when the intake air valve closes is before the lapse of the predetermined time from the present time. The throttle valve opening degree with respect to the accelerator pedal actuation amount at the calculated closing time of the intake air valve is read from the stored opening degree values of the throttle valve, and the fuel injection amount corresponding to this throttle valve opening degree is calculated. Then, the fuel injection amount calculated is injected at a predetermined timing earlier than the closing time of the intake air valve, i.e., upon detection of a predetermined crank angle position.

Specifically, in the air-fuel ratio control system of an air-amount-first fuel-amount-second type, the time when the throttle valve operation follows the actuation amount of the accelerator pedal is intentionally delayed, and the future motion of the throttle valve 3 can be determined from the amount of this delay. At the same time, the manner in which the intake air amount changes is determined by calculation. As a result, the intake air amount can be determined from the opening degree of the throttle valve 3 at the next closing time of the intake air valve of the fuel injector cylinder. The fuel amount corresponding to this intake air amount can be calculated at the time of calculating the next closing time of the intake air valve of the fuel injection cylinder. The fuel amount thus calculated can be injected at a predetermined timing before the intake air valve closing time, i.e., upon detection of a predetermine crank angle position. In this case, the intentional delay time is set longer than the time before the next closing time of the intake air valve of the fuel injection cylinder from the present time.

This intentional delay time is calculated in advance as a value longer than the time before the next closing time of the intake valve of the fuel injection cylinder from the time when the fuel injection amount is calculated in accordance with the rotational speed Ne of the internal combustion engine 1. This delay time is stored in the form of a map in the memory of the ECU 10 and read in accordance with the engine rotational speed Ne.

Figure 3A:
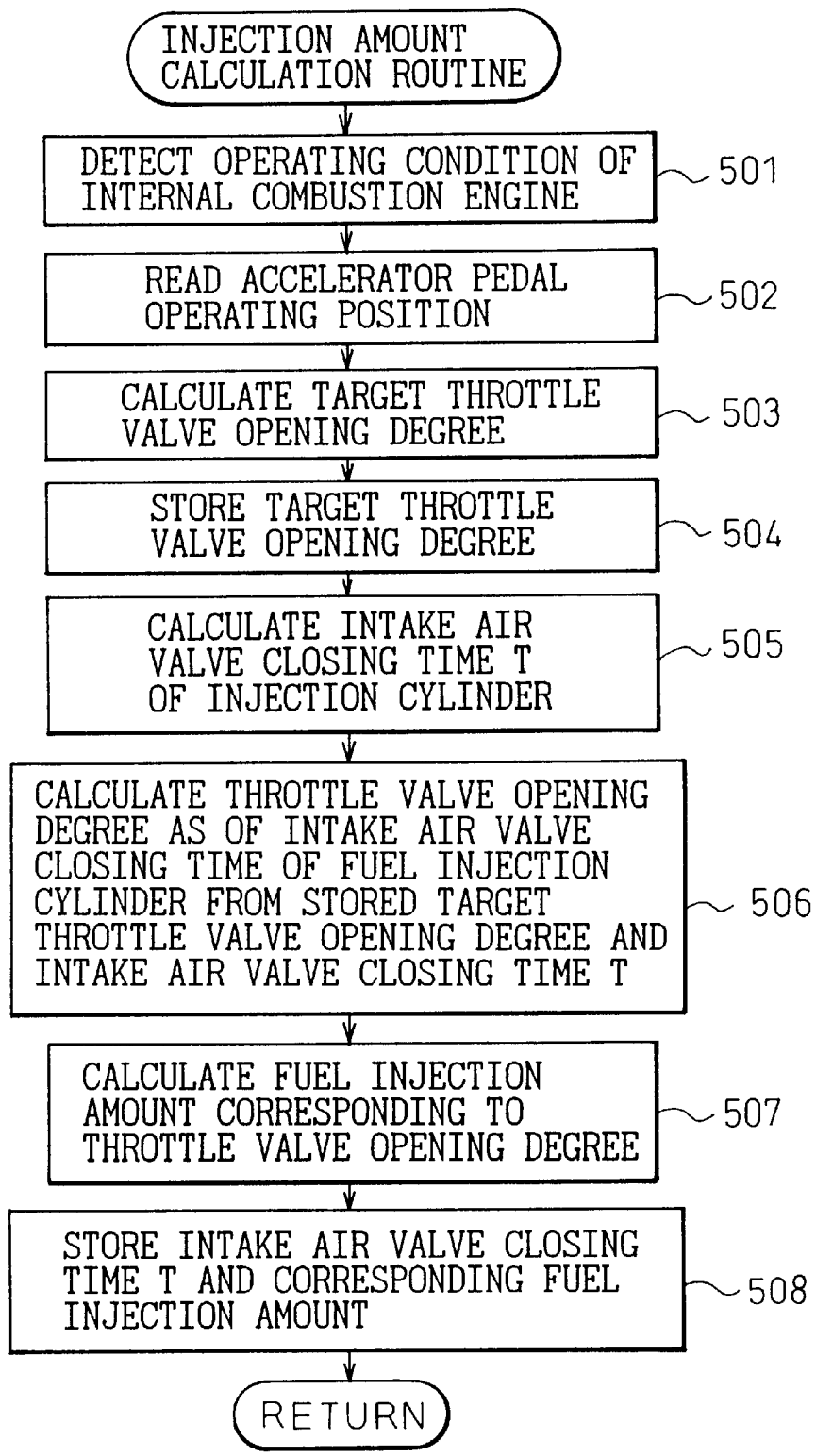
FIG. 3A is a flowchart showing an example of steps of calculating the fuel injection amount in a control apparatus for an internal combustion engine in the second aspect of the invention.
Figure 3B:
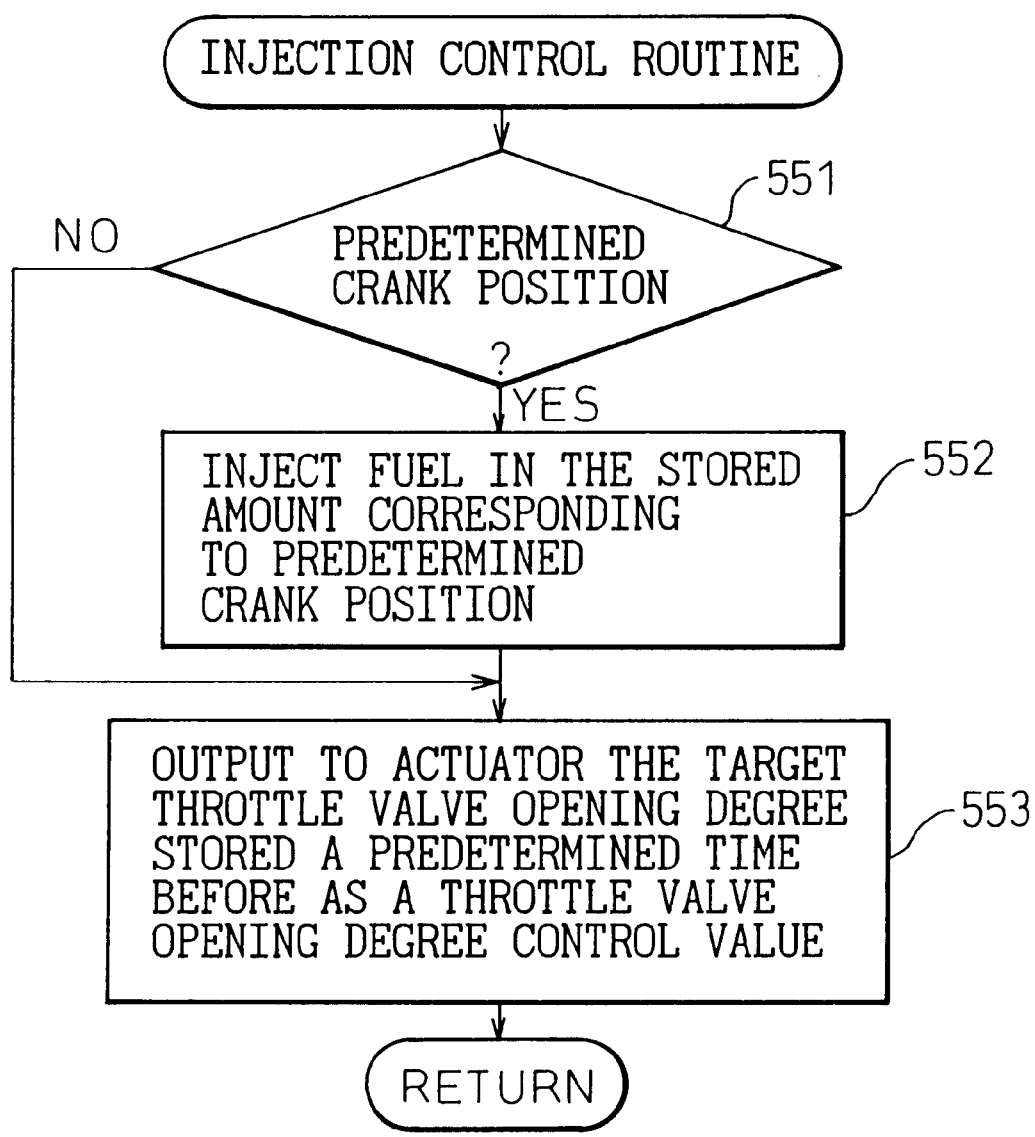
FIG. 3B is a flowchart showing steps of controlling the fuel injection in a control apparatus for an internal combustion engine in the second aspect of the invention.

Now, an example of a control process according to the second aspect of this invention will be explained with reference to the flowcharts of FIGS. 3A, 3B. The fuel injection calculation routine of FIG. 3A is executed at intervals of a predetermined crank angle, and the fuel control process of FIG. 3B is executed at intervals of a predetermined time. To facilitate the understanding, in the control process of FIGS. 3A, 3B, the actuator for driving the throttle valve 3 is assumed to have so high a response characteristic to the control value of the throttle valve opening degree that the response delay of the throttle valve opening degree with respect to the control value is ignored.

In FIG. 3A, first, step 501 detects the operating condition of the internal combustion engine 1. The detection of the operating condition is carried out by the ECU 10 retrieving such operating condition parameters as the engine rotational speed Ne, the intake air pressure P and the actuation amount (cooperating position) of the accelerator pedal from the various sensors. Step 502 reads the actuation amount of the accelerator pedal, followed by step 503 for calculating the target value of the throttle valve opening degree corresponding to the operating position of the accelerator pedal. In step 504, the target value of the throttle valve opening degree calculated in step 503 is stored in the RAM 104 of the ECU 10, and step 505 calculates the next closing time T of the intake air valve of the fuel injection cylinder from the operating condition of the engine detected in step 501.

Step 506 calculates the opening degree of the throttle valve 3 at the time when the intake air valve of the fuel injection cylinder closes from the target value of the throttle valve opening degree stored in step 503 and the intake air valve closing time T. Specifically, the time a predetermined delay time D earlier than the intake air valve closing time T is determined by calculation, and the target value of the throttle valve opening degree at that particular time is determined as the throttle valve opening degree at the intake air valve closing time T. After calculating the opening degree of the throttle valve 3 at the intake air valve closing time T in this way, step 507 calculates a fuel injection amount corresponding to the throttle valve opening degree. This fuel injection amount, though not explained in detail, can be calculated on the basis of the intake air amount determined from the throttle valve opening degree in such a manner as to achieve a target air-fuel ratio determined by calculations in other routines in accordance with the engine operating condition.

Step 508 stores the calculated intake air valve closing time T and the corresponding fuel injection amount in the RAM of the ECU 10, thus completing this routine.

In the injection control routine shown in FIG. 3B, on the other hand, step 551 judges a predetermined crank angle position representing a predetermined timing before the intake air valve closing time at intervals of a predetermined time. In the case where the predetermined angle position is judged, the process proceeds to step 552 for reading the fuel injection amount corresponding to the predetermined crank angle position from the RAM 104 of the ECU 10, and the fuel of this amount is injected from the fuel injection valve 8, followed by proceeding to step 553. In the case where the predetermined angle position is not judged in step 551, on the other hand, the process directly proceeds to step 553.

Step 553 reads the target value of the throttle valve opening degree stored in the RAM 104 of the ECU 10 a predetermined time D before the present time, and applies it to the actuator 4 as a control value of the throttle valve opening degree. The actuator 4 operates the throttle valve 3 on the basis of this control value of the throttle valve opening degree.

FIG. 4 is a diagram for explaining the chronological relation between the target value of the accelerator pedal actuation amount, the throttle valve opening degree and the intake air valve closing time with the lapse of time in the control process of FIGS. 3A, 3B.

In this case, assume that the time point when the fuel injection amount of the first cylinder #1 of the engine is calculated is the present time t0, that the time D by which the target value of the throttle valve opening is delayed is D and that the time when the intake air valve of the first cylinder #1 of the engine closes is T.

At present time to, the parameters such as the rotational speed Ne of the internal combustion engine 1, the intake air pressure P and the acceleration pedal actuation amount (operating position) are retrieved from the various sensors into the ECU 10. The target opening degree (target value) of the throttle valve corresponding to the present accelerator pedal operating position is calculated, while at the same time, from the engine operating condition, the intake valve closing time T, i.e., the time when the air intake stroke of the first cylinder #1 ends is calculated. The target opening degree of the throttle thus calculated is stored in the RAM 104 of the ECU 10.

Further, at the present time t0, the valve closing time T of the first cylinder #1 is calculated in accordance with the engine rotational speed Ne. After determining this valve closing time T, the time tn a predetermined delay time D ahead of the time T is calculated. The target opening degree of the throttle valve at this time point tn is thus calculated. The target opening degree of the throttle valve at the time point tn constitutes a target opening degree of the throttle valve at the time T when the intake air valve closes. Once the target opening degree of the throttle valve at the intake air valve closing time T is determined, the fuel injection amount can be calculated from the corresponding air amount. The fuel injection amount at the intake air valve closing time T1 of the second cylinder #2 can also be calculated at the time point t1 in a similar manner to the first cylinder #1.

Now, an explanation will be given of the control operation performed in the case where the response characteristic of the actuator 4 for driving the throttle valve 3 is low with respect to the control value of the throttle valve opening degree.

In the case where the response characteristic of the actuator 4 is low, as shown in FIG. 6, the target opening degree of the throttle valve is delayed behind even a linear change of the accelerator pedal actuation amount (target value of the accelerator pedal actuation). In such a case, the throttle valve opening degree delayed a predetermined time D is smaller than when the response characteristic of the actuator 4 is high. It is thus necessary to estimate the opening degree of the throttle valve conservatively at the time of closing the intake air valve of the fuel injection cylinder (first cylinder) #1. On the other hand, the actuator 4 is required to be driven at time T in accordance with the target value not delayed behind the accelerator pedal actuation time.

Figure 5:
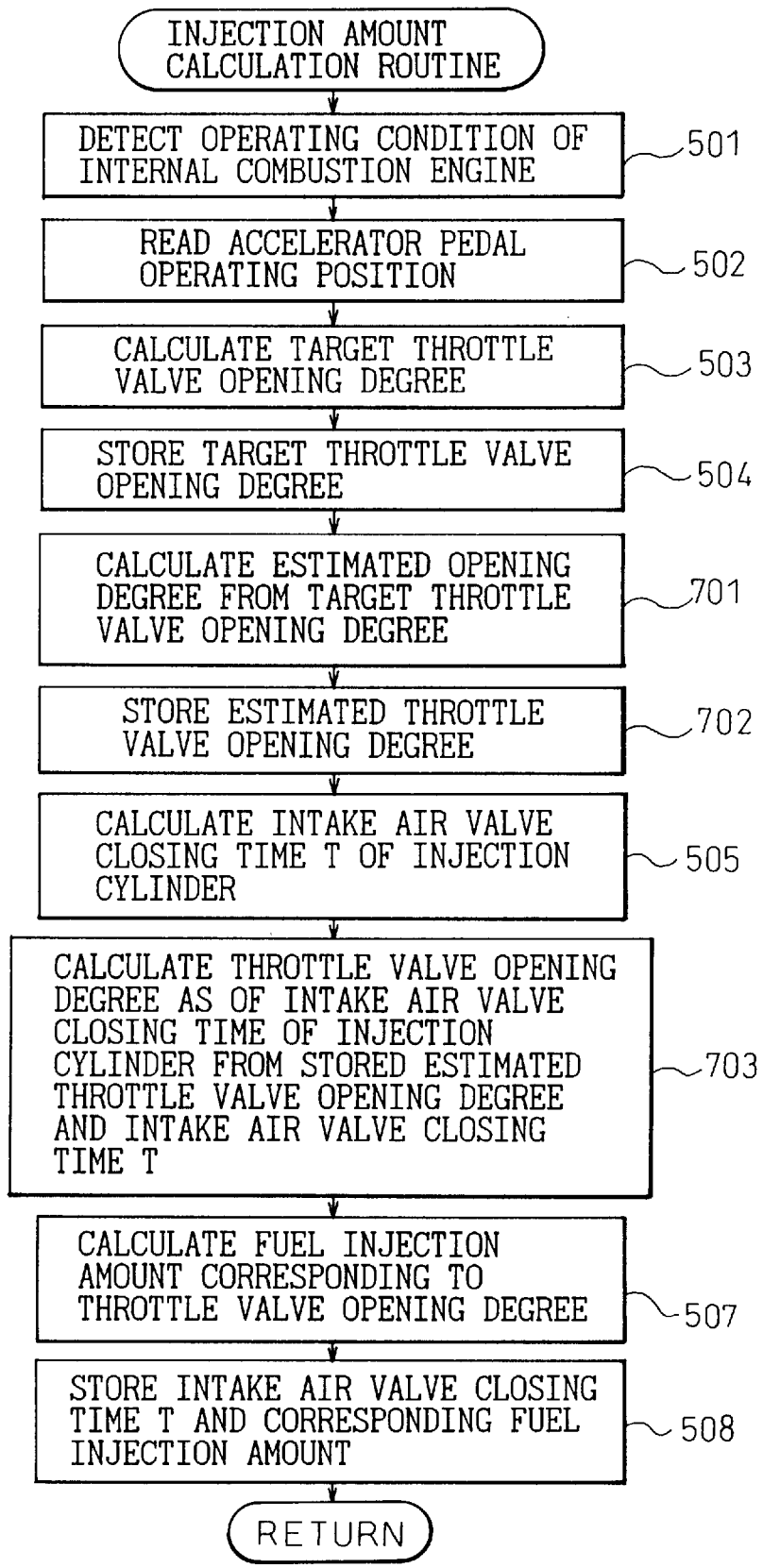
FIG. 5 is a flowchart showing a modification of the control steps in a control apparatus for an internal combustion engine in the second aspect of the invention.

The control process in such a case will be explained with reference to the flowchart shown in FIG. 5. In the control process of FIG. 5, the steps identical to those included in the control process explained with reference to FIG. 3A are designated by the same reference numerals, respectively, and will be described only briefly.

Step 501 detects the operating condition of the internal combustion engine 1. Step 502 reads the operating position of the accelerator pedal. Step 503 calculates a target value of the throttle valve opening degree corresponding to the operating position of the accelerator pedal. In step 504, the target value of the throttle valve opening degree calculated in step 503 is stored in the RAM 104 of the ECU 10. The steps up to this point are exactly identical to the corresponding steps in the flowchart of FIG. 3A.

Step 701 calculates an estimated value of the throttle valve opening degree (estimated opening degree) from the response characteristic of the actuator on the basis of the target value of the throttle valve opening degree calculated in step 503. In step 702, the estimated opening degree of the throttle valve calculated is stored in the RAM 104 of the ECU 10.

Step 505 calculates the next intake valve closing time T of the fuel injection cylinder from the operating condition of the engine detected in step 501.

Step 703 calculates the opening degree of the throttle valve 3 at the time of closing the intake air valve of the fuel injection cylinder from the estimated opening degree of the throttle valve stored in step 702 and the time T when the intake air valve closes. Specifically, the time a predetermined delay time D ahead of the intake air valve closing time T is determined by calculation, and the estimated value of the throttle valve opening degree at that particular time is determined as the throttle valve opening degree at the intake air valve closing time T. After calculating the opening degree of the throttle valve 3 at the intake air valve closing time T in this way, step 507 calculates the fuel injection amount corresponding to the throttle valve opening degree, followed by step 508 Ln which the intake air valve closing time T calculated in step 507 and the corresponding fuel injection amount are stored in the RAM 104 of the ECU 10, thereby completing this routine.

Even in the case where the response characteristic of the actuator for driving the throttle valve 3 is low with respect to the control value of the throttle valve opening degree, the injection control routine described with reference to FIG. 3B can be used as it is.

An explanation will be given of another control operation with a low response characteristic of the actuator 4 for driving the throttle valve 3 with respect to the throttle valve opening degree control value.

Figure 7A:
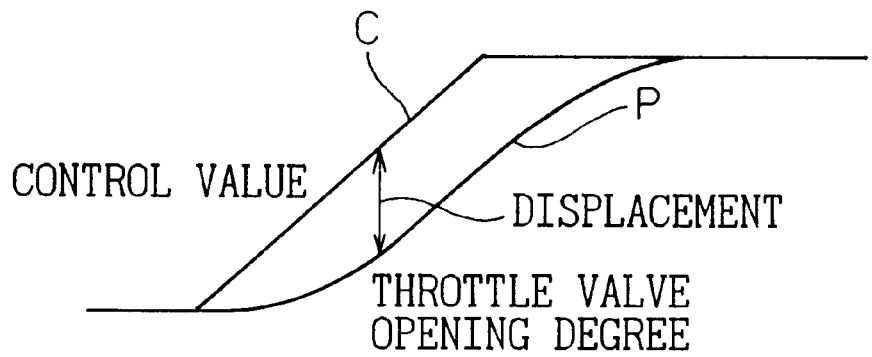
FIG. 7A is a characteristic diagram showing the difference between a target value of the throttle valve opening degree and an actual throttle valve opening degree.

Now, assume that the control value of the throttle valve opening degree having a characteristic as shown by solid line C is output to the actuator 4 for driving the throttle valve 3 as shown in FIG. 7A. In the case where the response characteristic of the actuator 4 for driving the throttle valve 3 is low with respect to the control value C of the throttle valve opening degree, the opening degree of the throttle valve 3 is delayed as shown by solid line P and is thus displaced from the throttle valve opening degree control value C.

Figure 7B:
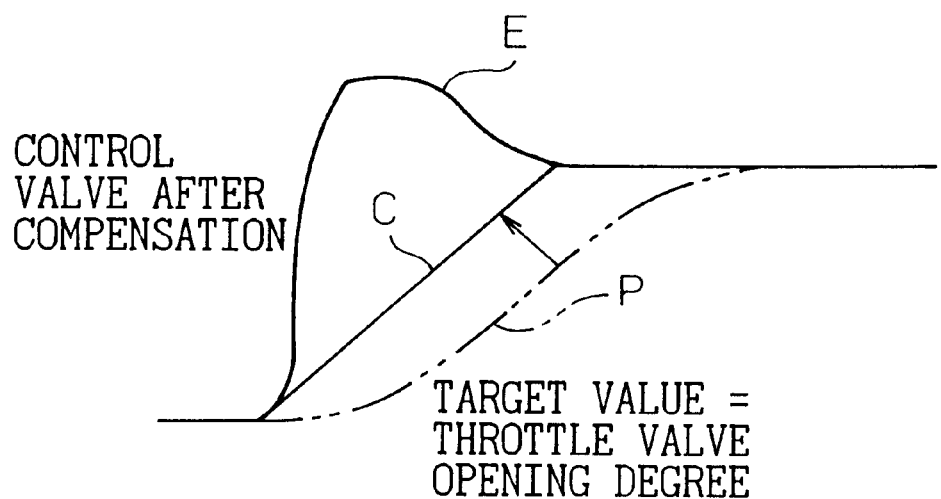
FIG. 7B is a characteristic diagram showing the difference between a compensated target value of the throttle valve opening degree and an actual throttle valve opening degree.

In view of this, as shown by solid line E in FIG. 7B, the magnitude of the throttle valve opening degree control value is increased for compensation. Consequently, even when the response characteristic of the actuator 4 is low with respect to the compensated large control value of the throttle valve opening degree, the result of the delay constitutes a regular control value C for the throttle valve opening in the same situation as if the delay is eliminated.

FIG. 8A is a functional diagram showing the PID control process in the case where the control value of the throttle valve opening degree is rot compensated for, in which case the control value C of the throttle valve opening degree as shown in FIG. 7A is produced. A target value of the throttle valve opening degree is determined from the accelerator pedal actuation amount detected by the sensor. After the PID control is effected with this target value, the target value is converted into a voltage duty factor and output to a throttle motor making up the actuator. The drive of the throttle motor is detected by a throttle sensor, and fed back to the PID control section as a throttle sensor value.

FIG. 8B is a function diagram showing the steps of the PID control process in the case where the control value of the throttle valve opening degree is compensated for, which diagram corresponds to the characteristic diagram of FIG. 7B. In this configuration, the first stage of the PID control section includes a phase lead compensator.

Figure 9:
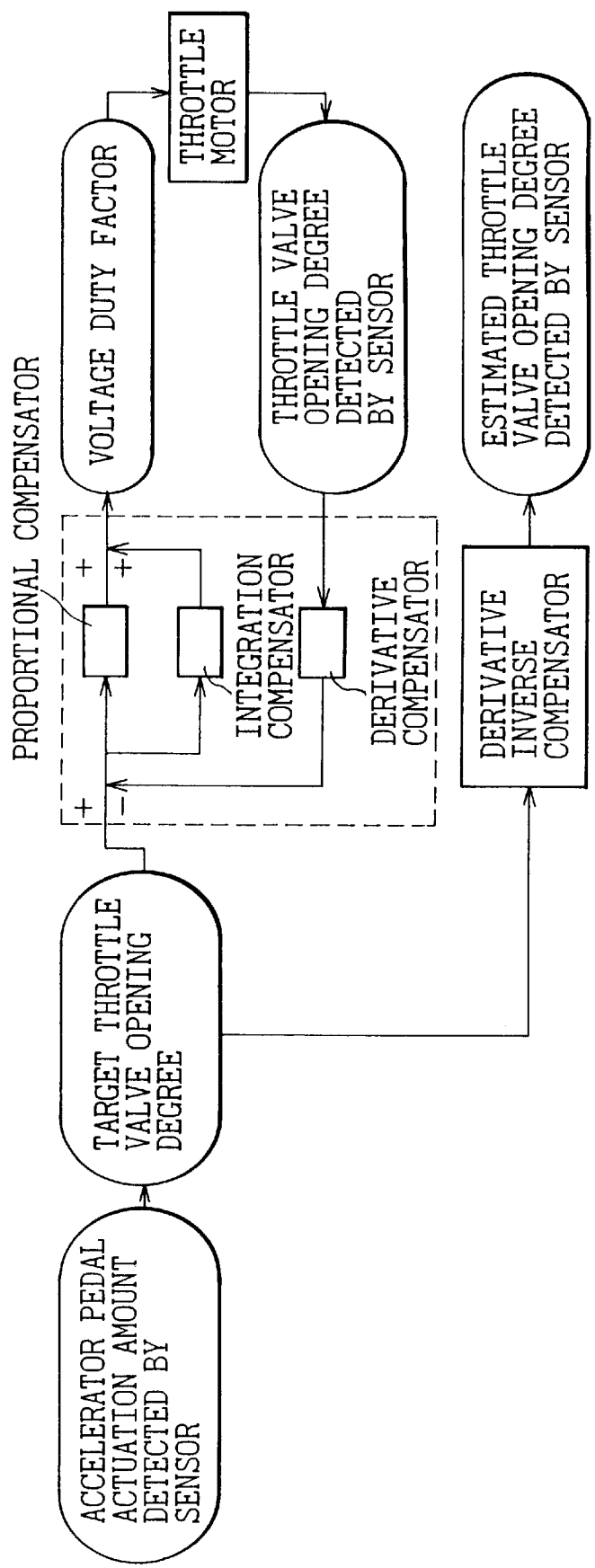

FIG. 9 is a function diagram showing the steps of the PID control in the case where the target value of the throttle valve opening degree used for calculation of the fuel supply amount is compensated for. In this configuration, the target throttle valve opening degree is processed in a integral compensation section for calculating the fuel supply amount using the estimated throttle valve opening degree detected by the sensor after compensation.

The embodiments described above refer to a configuration based on a control technique using only the value at a specified time. In view of the fact that the response in the change of intake air amount is delayed behind the change in the throttle valve opening degree, however, a more strict calculation of the intake air amount preferably takes into consideration the change in the throttle valve opening degree before the time of closing the intake valve as well the throttle valve opening degree as of the time when the intake air valve closes. For this reason, an alternative method can be used in which the change in the target value of the throttle valve opening degree is detected, and the change in the opening degree of the throttle valve up to the time when the intake air valve closes is calculated. Then, the intake air amount corresponding to the change in the throttle valve opening degree is calculated. In accordance with this intake air amount, the fuel supply amount can be calculated.

As described above, according to the first aspect of the Invention, the throttle valve opening degree at the intake air valve closing time is calculated by comparison between the time before the throttle valve reaches a target opening degree value and the intake air valve closing time thereby to determine the air amount at the intake air valve closing time. Tn this way, the required fuel supply amount can be determined and hence an accurate air-fuel ratio control is made possible.

According to the second aspect of the invention, on the other hand, a predetermined delay time is set for controlling the throttle valve opening degree, whereby it becomes possible to determine the future behavior of the throttle valve opening degree during a predetermined time, and by determining the air amount at the time of closing the intake air valve, the required fuel supply amount can be grasped and hence an accurate air-fuel control operation is made possible.

In the control apparatus for an internal combustion engine according to the third aspect of the invention having a configuration shown in FIG. 1, the opening degree of the electronically-controlled throttle valve associated with the present amount of the accelerator pedal actuation by the driver are stored and the output thereof is held for a predetermined time, and after the predetermined time, this output is applied to the actuator of the electronically-controlled throttle valve. As a result, the present accelerator pedal actuation amount is slightly delayed intentionally and applied to the actuator of the electronically-controlled throttle valve. Thus the throttle valve operates in keeping with the operation amount of the accelerator pedal by being delayed by the predetermined time.

According to the third aspect, the next intake air valve closing time of the fuel injection valve is calculated while the above-mentioned output is held for a predetermined time. The intake air valve closing time may be before or after the lapse of a predetermined time constituting the intentional delay time from the present time in accordance with the engine rotational speed.

In either case, the opening degree of the throttle valve with respect to the accelerator pedal actuation amount at the calculated time of closing the intake air valve is read from the stored opening degree values of the throttle valve, and the fuel injection amount corresponding to the particular throttle valve opening degree is calculated. The calculated fuel injection amount is injected at a predetermined timing before the intake valve closing time, i.e., upon detection of a predetermined crank angle position.

Specifically, in the air-fuel ratio control method of air-amount-first fuel-amount second type, the future motion of the throttle valve 3 can be determined by an amount equivalent to the opening degree of the throttle valve 3 intentionally delayed behind the accelerator pedal actuation, and the corresponding change in the intake air amount can be determined by calculation. As a result, the intake air amount can be determined from the opening degree of the throttle valve 3 at the next intake valve closing time of the fuel injection cylinder. The fuel corresponding to this intake air amount thus can be calculated at the time when the next intake valve closing time of the fuel injection cylinder is calculated. The fuel thus calculated can be injected at a predetermined timing ahead of the intake air valve closing time of the fuel injection cylinder, i.e., upon detection of a predetermined crank angle position.

This intentional delay time, if larger than a widely-used predetermined rotational speed Ne of the internal combustion engine 1, is calculated and stored beforehand in the memory of the ECU 10 as a value longer than the period from the fuel injection amount calculation time to the next time of closing the intake air valve of the fuel injection cylinder, and can be read out whenever required.

Now, an explanation will be given of an example of the control process according to the third aspect of the invention with reference to the flowcharts shown in FIGS. 10A to 11. The fuel injection calculation routine of FIGS. 10A, 10B is executed at intervals of a predetermined crank angle, and the injection control routine shown in FIG. 1 is executed at intervals of a predetermined time.

The response characteristic of the actuator 4 for driving the throttle valve 3 is unavoidably delayed behind the control value of the throttle valve opening degree. In the case where the actuator 4 has a response delay, the target opening degree of the throttle valve is delayed behind the actuation amount of the accelerator pedal (accelerator pedal actuation target value) even when the later changes linearly. In such a case, the throttle valve opening degree delayed by a predetermined time D is smaller than in the case where the actuator 4 responds without any time lag. As a result, it is necessary to estimate the throttle valve opening degree conservatively at the time of closing the intake air valve of the fuel injection cylinder (say, the first cylinder #1). The actuator 4 is required to be driven at time point T, on the other hand, in accordance with a target value not delayed behind the accelerator pedal actuation amount.

Figure 10A:
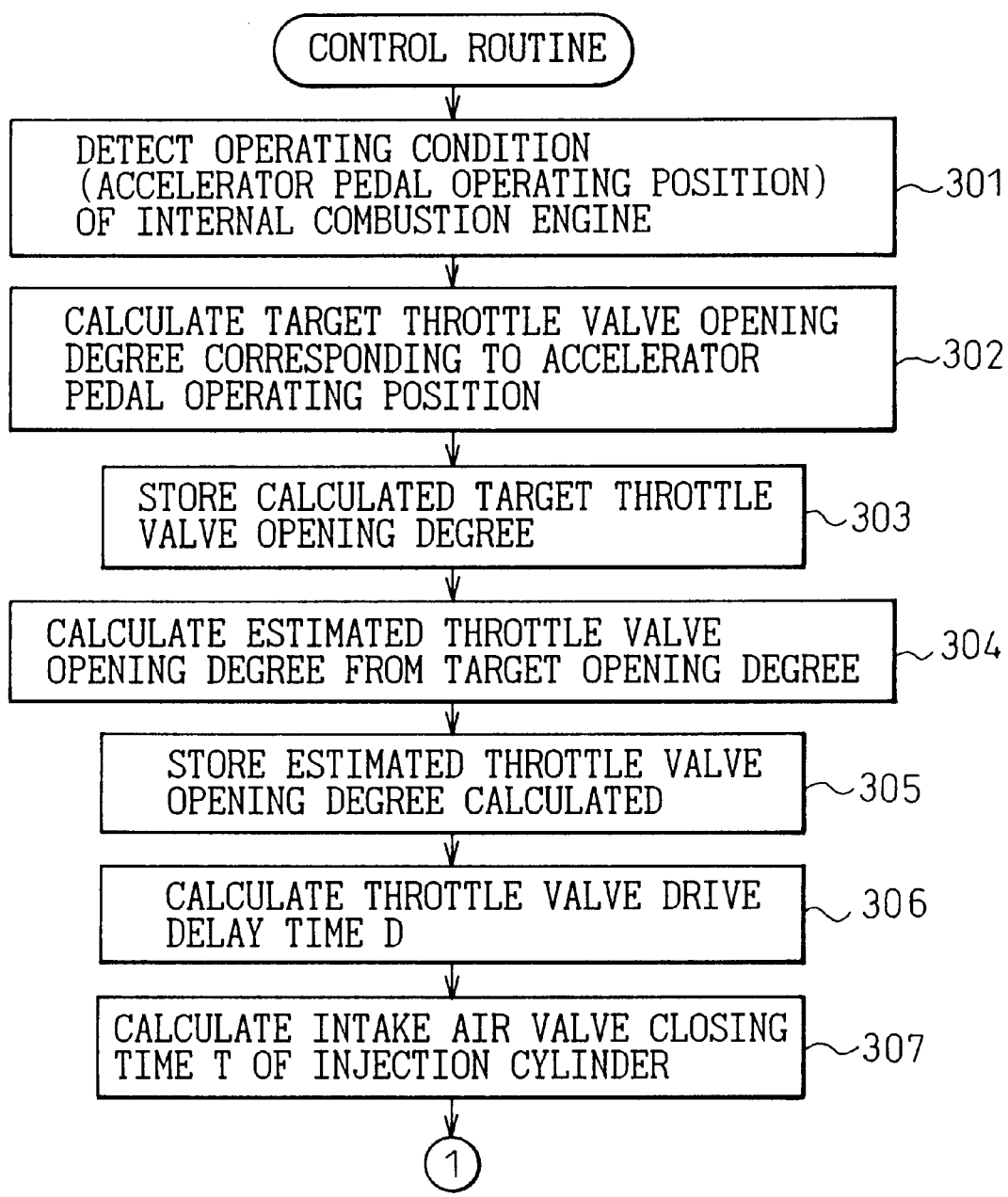
FIGS. 10A, 10B are flowcharts showing an example of steps for calculating the fuel injection amount in a control apparatus for an internal combustion engine in the third aspect of the invention.
Figure 10B:
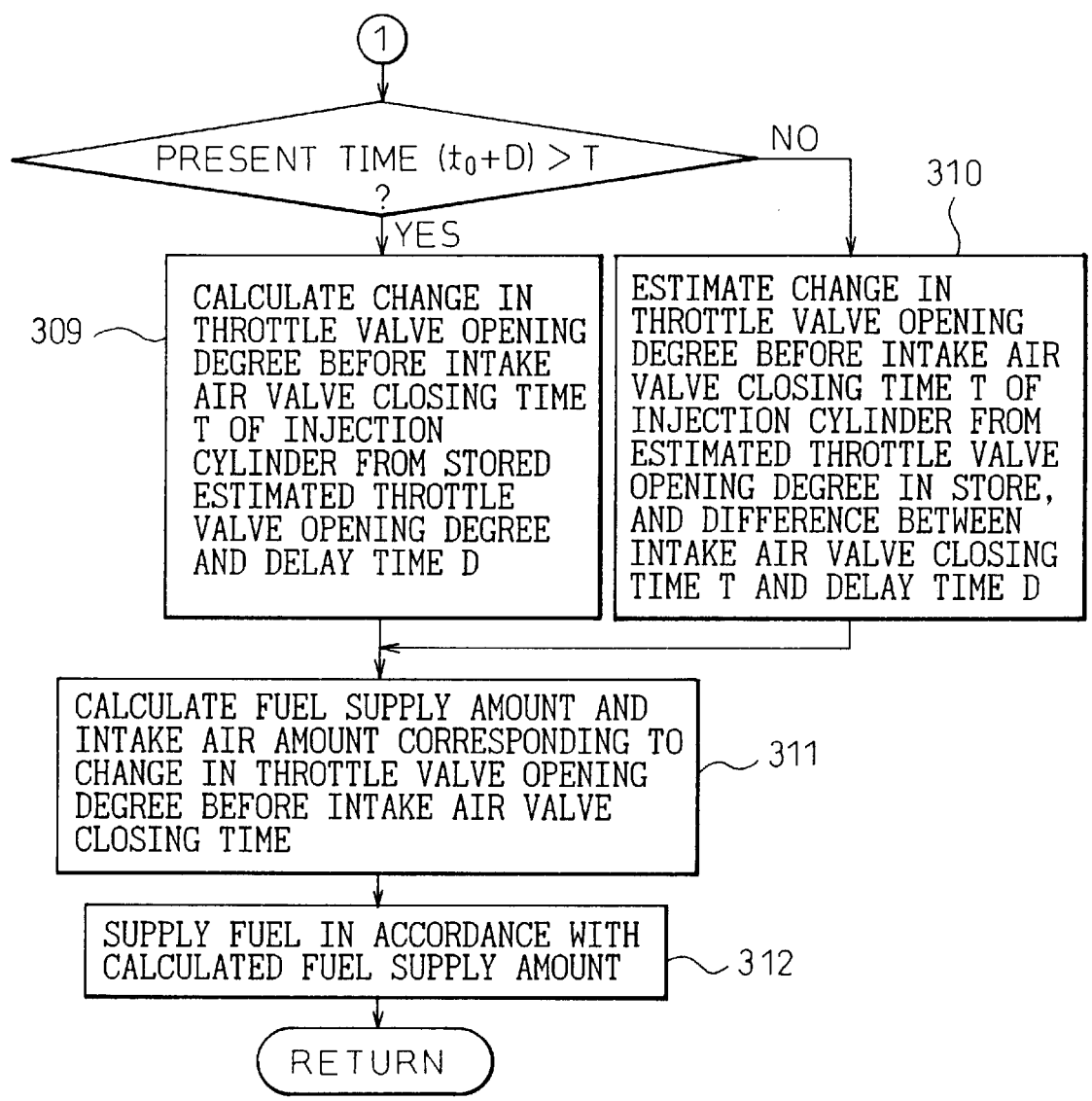

In FIGS. 10A, 10B, step 301 detects the operating condition of the internal combustion engine 1. The operating condition is detected by storing in the ECU 10 the operating condition parameters such as the engine rotational speed Ne, the intake air pressure P and the accelerator pedal actuation amount (operating position) produced from various sensors. Step 302 calculates a target value of the throttle valve opening degree corresponding to the stored accelerator pedal operating position. In step 304, the target value of the throttle valve opening degree calculated in step 303 is stored in the RAM 104 of the ECU 10.

Step 304 determines by calculation an estimated value of the throttle valve opening degree (estimated opening degree) from the response characteristic of the actuator on the basis of the target value of the throttle valve opening degree calculated in step 303. In step 305, the estimated opening degree of the throttle valve calculated in step 305 is stored in the RAM 104 of the ECU 10.

Step 306 calculates by reading from the memory of the ECU 10 the delay time D for driving the throttle valve. Step 307 calculates the next intake air valve closing time of the fuel injection cylinder from the operating condition of the engine detected in step 301.

Step 308 judges which is earlier, the time that has elapsed from the present time t0 by the delay time D for driving the throttle valve calculated in step 306 or the next intake air valve closing time T of the fuel injection cylinder. In the case where the time that has elapsed by the delay time D from the present time t0 is later than the next intake air valve closing time T of the fuel injection cylinder (YES), the process proceeds to step 309. In the event that the time that has elapsed by the delay time D from the present time t0 is earlier than the next intake air valve closing time T of the fuel injection cylinder (NO), on the other hand, the process passes to step 310.

In step 309 to which the process proceeds in the case where the time that has elapsed by the delay time D from the present time t0 is later than the next intake air valve closing time T of the fuel injection cylinder, the opening degree of the throttle valve 3 at the time of closing the intake air valve of the fuel injection cylinder is calculated from an estimated opening degree of the throttle valve stored in step 305 and the intake air valve closing time T. Specifically, the time tn a predetermined delay time D before the intake air valve closing time T is determined by calculation, and the estimated value of the throttle valve opening degree at this time tn is determined as the throttle valve opening degree at the time T of closing the intake air valve. After calculating the opening degree of the throttle valve 3 at the intake air valve closing time T in this way, the process proceeds to step 311.

In step 310 to which the process proceeds in the case where the time point after the lapse of a delay time D from the present time point t0 is earlier than the next intake air valve closing time T of the fuel injection cylinder, on the other hand, the opening degree of the throttle valve 3 at the time of closing the intake air valve of the fuel injection cylinder is calculated from the estimated opening degree of the throttle valve, the intake air closing time T stored in step 305 and the delay time D. Specifically, the time point tr a predetermined delay time D later than the present time point t0 is determined by calculation, and the time lag E is determined between the time tr and the intake air valve closing time T. The estimated value of the throttle valve opening degree at the time point tp after the lapse of the time lag E from the present time t0 is determined as the throttle valve opening degree as of the intake air valve closing time T. After calculating the opening degree of the throttle valve 3 as of the time intake air valve closing time T in this way, the process proceeds to step 311.

Step 311 calculates the intake air amount and the fuel supply amount corresponding to the change in the throttle valve opening degree up to the intake air valve closing time T. Step 312 supplies the fuel in accordance with the result of the calculation of the fuel supply amount and thus completes this routine. The calculation in step 311 of the intake air amount corresponding to the change in the throttle valve opening degree before the intake air valve closing time T will be described later.

Figure 11:
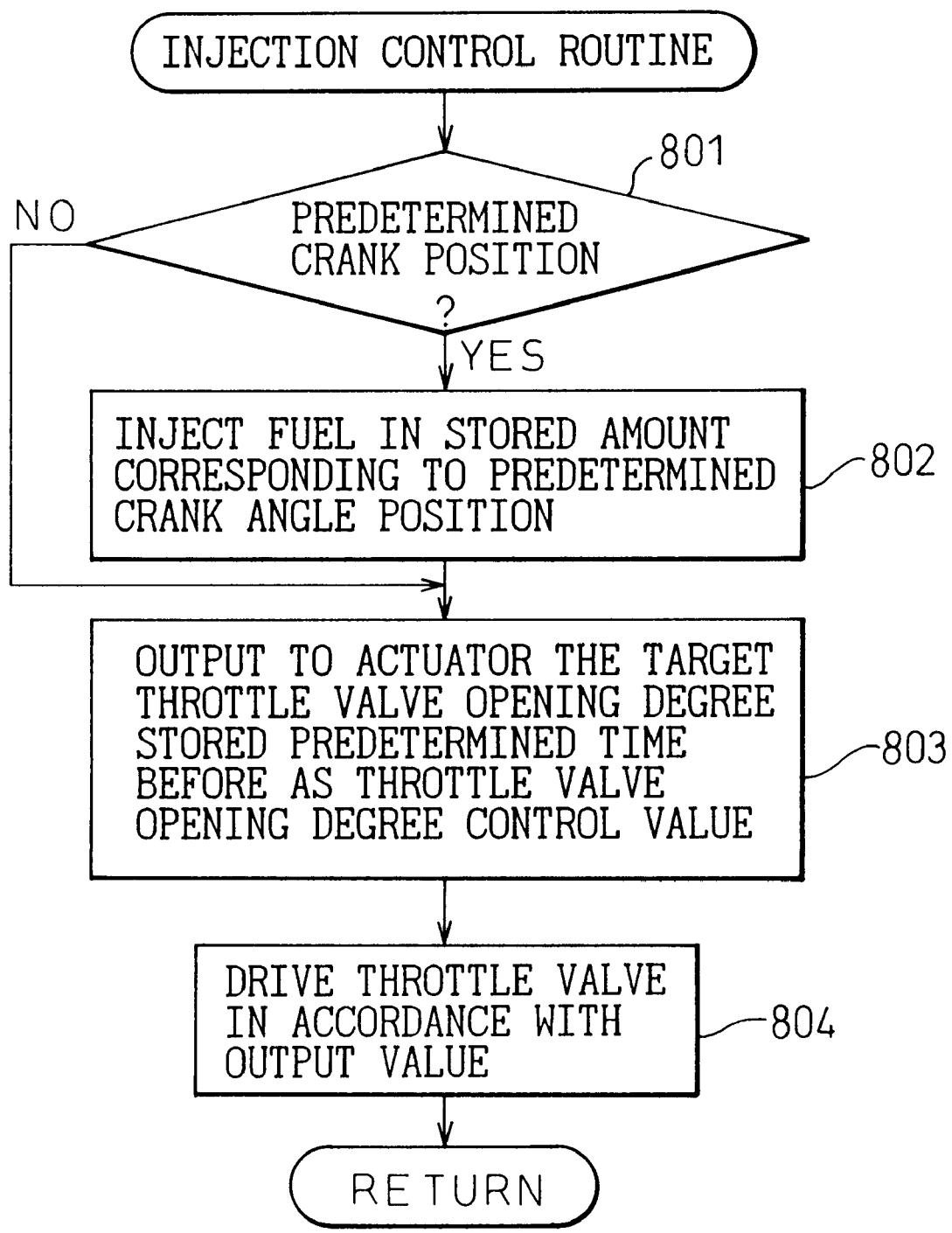
FIG. 11 is a flowchart showing the steps of fuel injection control in a control apparatus for an internal combustion engine in the third aspect of the invention.

In the injection control routine shown in FIG. 11, on the other hand, step 801 judges whether a predetermined crank angle position representing a predetermined timing before the intake air valve closing time T is involved at intervals of a predetermined time. In the case where the predetermined crank angle position is involved, the process proceeds to step 802 for reading the fuel injection amount corresponding to the predetermined crank angle position from the RAM 104 of the ECU 10, and the fuel injection amount corresponding to the predetermined crank angle position is read out, and the fuel in this amount is injected from the injection valve 8, followed by proceeding to step 803. In the case were the predetermined crank angle position is not judged in step 801, on the other hand, the process proceeds directly to step 803.

Step 803 reads a target value of the throttle valve opening degree stored in the RAM 104 of the ECU 10 a predetermined time D before the present time, and outputs it to the actuator 4 as a control value of the throttle valve opening degree. The actuator 4 operates the throttle valve 3 in step 804 on the basis of this control value of the throttle valve opening degree.

FIG. 6 is a diagram showing the chronological relation between the target value of the accelerator pedal actuation, the throttle valve opening degree and the intake air valve closing time in the case where the time point after the lapse of the delay time D from the present time t0 in the control process of FIG. 11 is later than the next intake air valve closing time T of the fuel injection cylinder.

In FIG. 6, the time point when the fuel injection amount of the first cylinder #1 of the engine is calculated is the present time t0, and the time by which the target value of the throttle valve opening degree is delayed is D and the intake valve closing time of the first cylinder #1 of the engine is given as T.

At the present time t0, the operating condition parameters including the engine rotational speed Ne of the internal combustion engine 1, the intake air pressure P and the accelerator pedal actuation amount (operating position) are retrieved into the ECU 10 from various sensors. The target opening degree of the throttle valve (target value) corresponding to the present accelerator pedal operating position is calculated. At the same time, the intake valve closing time T, i.e., the time point when the air intake stroke of the first cylinder #1 ends is calculated from the operating condition of the engine. The calculated target value of the throttle valve is stored in the RAM 104 of the ECU 10.

After determining the closing time T of the first cylinder #1 as of the present time t0, the time point tn a predetermined delay time D before the time T is calculated, so that the estimated opening degree of the throttle valve at time point tn is calculated. The estimated opening degree of the throttle valve at time point tn is already stored in the RAM 104 of the ECU 10.

The estimated opening degree of the throttle valve at time point tn represents an estimated opening degree of the throttle valve as of the intake air valve closing time T. Once the estimated opening degree of the throttle valve 3 as of the intake air valve closing time T is calculated in this way, the fuel injection amount can be calculated from the corresponding air amount. The fuel injection amount at the intake air valve closing time T1 of the second cylinder #2 can also be calculated at time point t1 in a manner similar to the method for the first cylinder #1.

Figure 12:
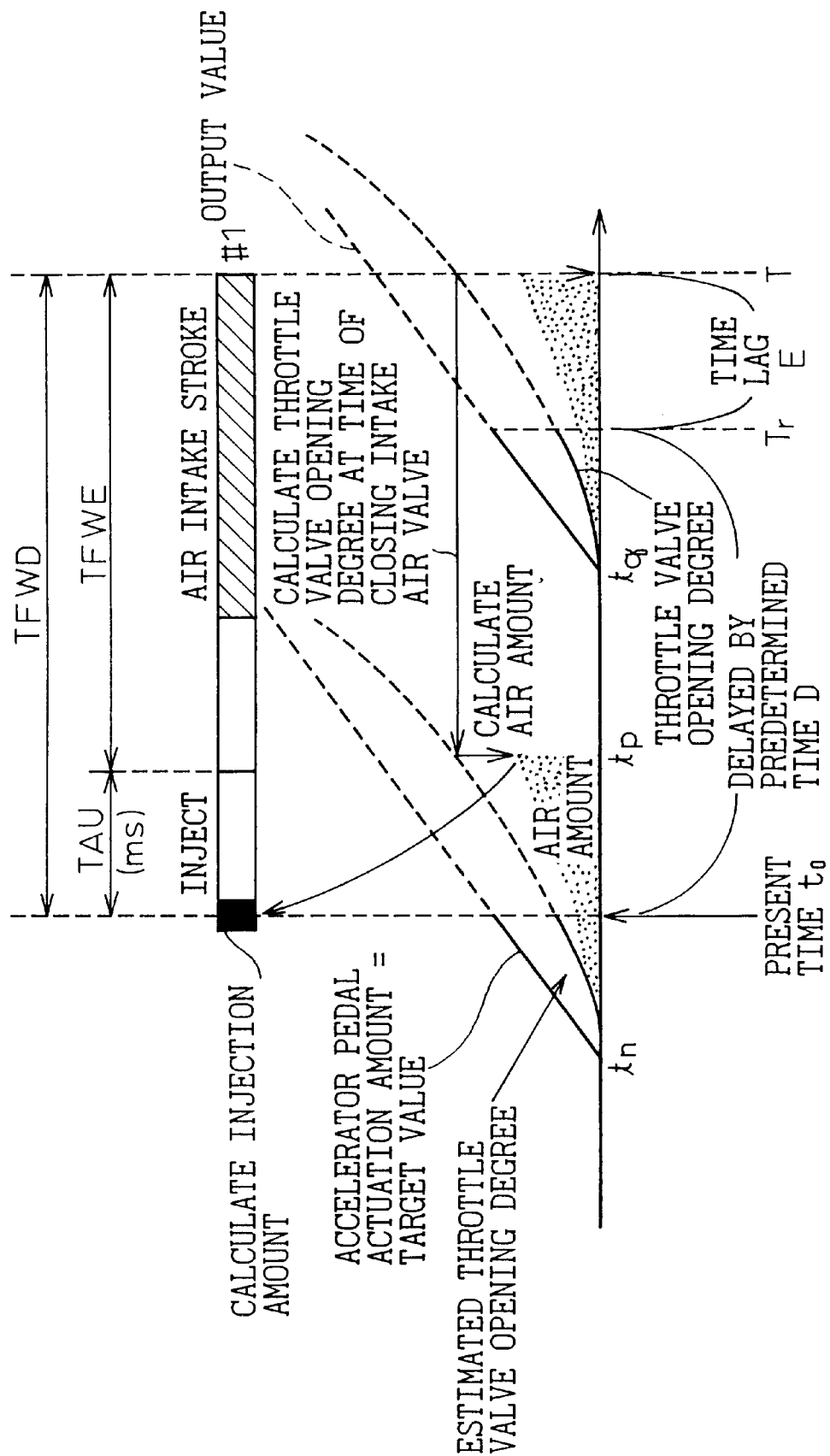
FIG. 12 is a diagram for explaining the relation between the accelerator pedal actuation amount, the throttle valve opening degree and the timing of closing the intake air valve with respect to the lapse of time in the case where the present time plus a delay time is earlier than the timing of the intake air valve of the next fuel injection cylinder in the control steps of FIGS. 10A, 10B.

FIG. 12 is a diagram for explaining the chronological relation between the target accelerator pedal actuation amount, the throttle valve opening degree and the intake air valve closing time in the case where the time point after the lapse of a delay time D from the present time t0 in the control process of FIGS. 10A to 11 is earlier than the next intake air valve closing time T of the fuel injection cylinder with the lapse of time.

As in FIG. 6, the time point when the fuel injection amount for the first cylinder #1 of the engine is calculated is the present time t0, D is the delay time of the target value of the throttle valve opening degree, and T is the intake air valve closing time of the first cylinder #1 of the engine. At the present time t0, the target opening degree of the throttle valve corresponding to the operating position of the accelerator pedal is similarly calculated from the operating condition of the engine, while at the same time calculating the intake air valve closing time T of the first cylinder #1. The target opening degree of the throttle valve thus calculated is stored in the RAM 104 of the ECU 10.

Also, the time tr a predetermined delay time D later than the present time t0 is calculated at time point t0, and the time lag E between the time tr and the intake air valve closing time T is determined. An estimated value of the throttle valve opening degree at the time point tp after the lapse of the time lag E froff the present time t0 is calculated. The estimated opening degree of the throttle valve at time point tp represents the estimated opening degree of the throttle valve at the intake air valve closing time T.

After calculating the estimated opening degree of the throttle valve 3 at the intake air valve closing time T in this way, the fuel injection amount can be calculated from the corresponding air amount.

In the above-mentioned control operation, the throttle valve opening degree before the present time t0 can be determined from the change in the operating position of the accelerator pedal. As a result, in the case where the time after the lapse of the delay time D from the present time point t0 is later than the next intake air valve closing time T of the fuel injection cylinder (the control operation of FIG. 5), the change in the throttle valve opening degree can be determined from the past change in the accelerator pecal actuation amount. The intake air amount as of the intake air valve closing time T thus can be calculated.

In the case where the time after the lapse of the delay time D from the present time t0 is earlier than the next intake air valve closing time T of the fuel injection cylinder (the control operation of FIG. 6), by contrast, the change in the throttle valve opening degree before the present time t0 is known from the past change in the operating position of the accelerator pedal, but not the estimated opening degree of the throttle valve at time point tp, i.e., the estimated opening degree of the throttle valve as of the intake air valve closing time T. In spite of this, the electronically-controlled throttle valve is incapable of sudden motion in response to the actuation amount of the accelerator pedal and also has a response delay. The motion of the electronically-controlled throttle valve, therefore, can be predicted to a certain degree. According to the present invention, therefore, as shown in FIG. 12, the change in the estimated opening degree of the throttle valve from the present time t0 to the time point tp is estimated as indicated by the dotted line on the basis of the change in the estimated opening degree of the throttle valve before the present time t0 indicated by solid line.

Once the change in the estimated value of the throttle valve opening degree from the present time t0 to the time point tp can be calculated, as in the case of FIG. 6, the intake air amount before the intake air valve closing time T can be determined from the change characteristic.

Actually, however, even when the change in the estimated value of the throttle valve opening degree and the estimated opening degree of the throttle valve as of the intake air valve closing time T are known, the intake air amount before the intake air valve closing time T cannot be determined. The reason is that even when the throttle valve is opened, the response delay of the intake air amount must be taken into consideration. The actual intake air amount, therefore, as shown by half-tone dots in FIG. 12, is considered to be smaller than the intake air amount based on the estimated opening degree of the throttle valve indicated by dotted line. According to this invention, therefore, the response delay of the intake air amount is calculated from the manner in which the throttle valve has thus far opened thereby to calculate the actual intake air amount. A method of this calculation will be explained with reference to FIGS. 13 to 15B.

Figure 13:
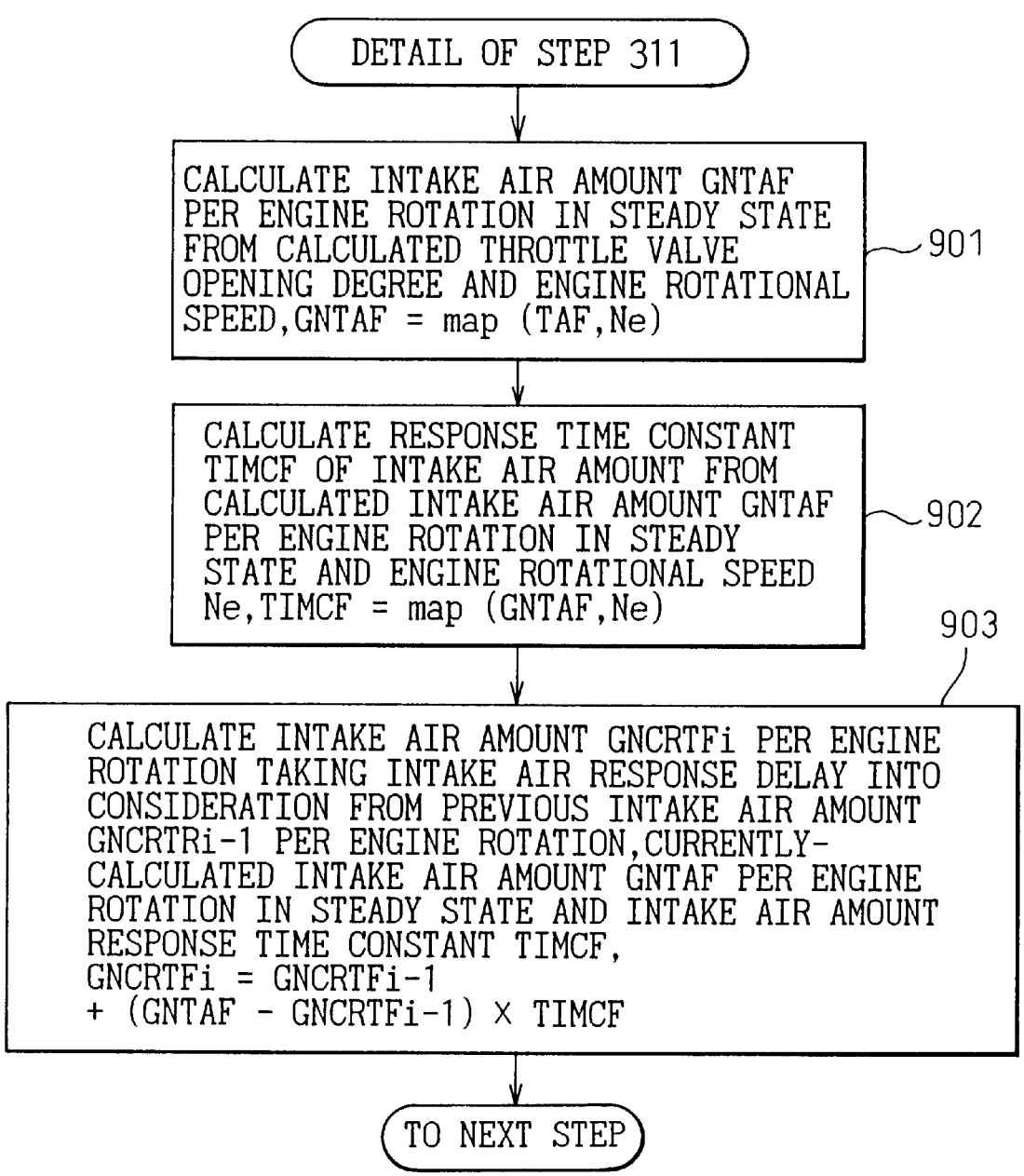
FIG. 13 is a flowchart showing an example of steps of calculating the intake air amount in the control steps of FIGS. 10A, 10B.

FIG. 13 is a flowchart showing the steps of calculating the intake air amount corresponding to the change in the estimated opening degree of the throttle valve before the intake air valve closing time T in step 311 of the process explained with reference to FIG. 10B. This control operation is performed at regular time intervals of 8 ms.

Figure 14A:
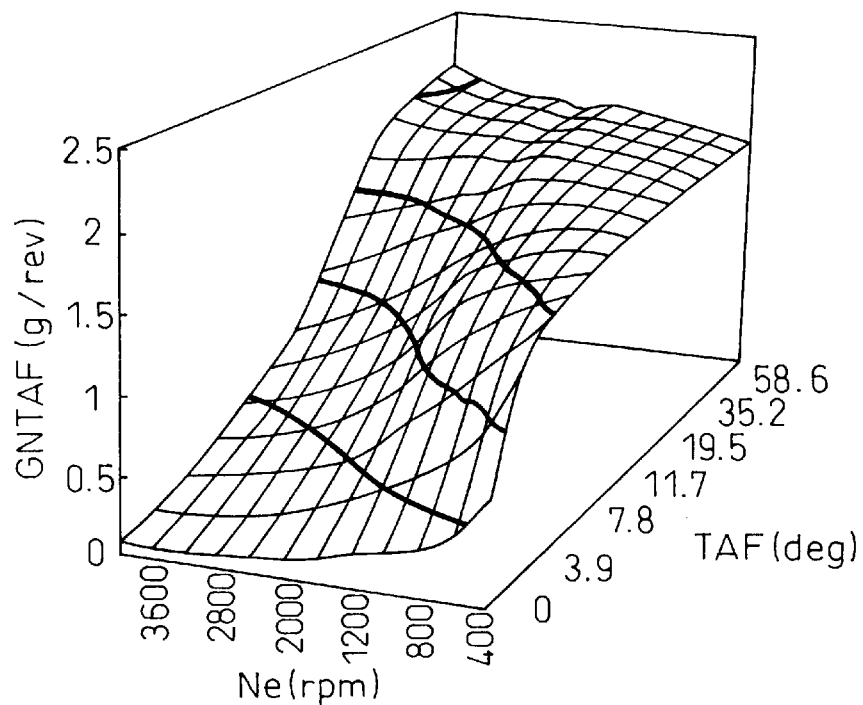
FIG. 14A is a map used for calculating the intake air amount per engine rotation in the control steps of FIG. 13.

Step 901 calculates the intake air amount GNTAF (a value ignoring the response delay) per rotation of the engine in steady state at the estimated throttle valve opening degree at regular time intervals. This calculation can be performed using GNTAF=map(TAF, Ne)

using the map shown in FIG. 14A determined in advance by experiment. In this equation, TAF is the estimate opening degree of the throttle valve at time point tp in FIG. 12.

Figure 14B:
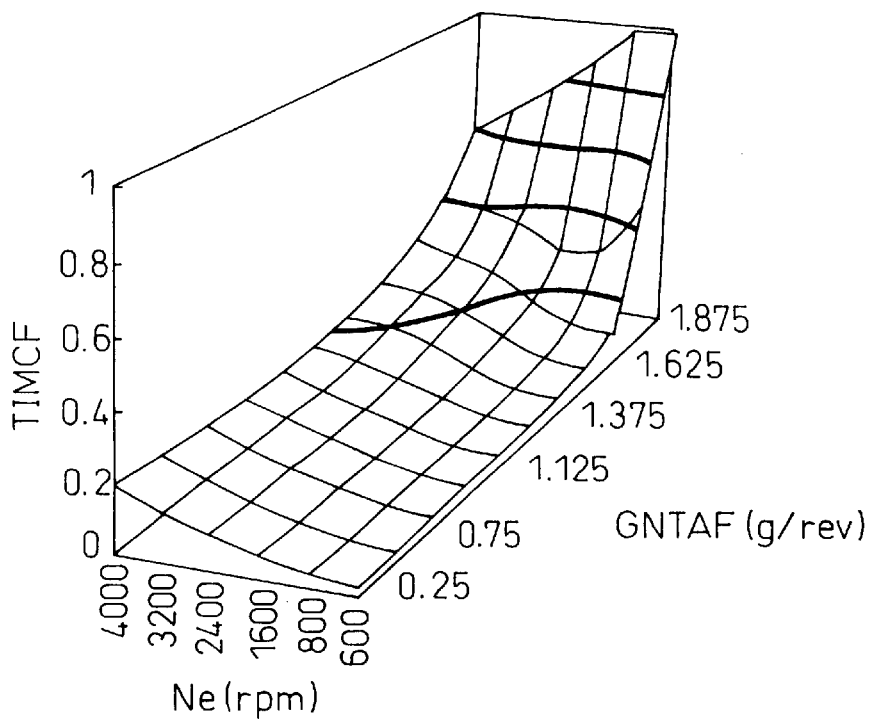
FIG. 14B is a map used for calculating a response time constant of the intake air amount in the control steps of FIG. 13.

Step 902 calculates the response time constant TIMCF of the intake air amount from the intake air amount GNTAF per engine rotation and the engine rotational speed Ne calculated in steady state. This calculation can be performed using TIMCF=map(GNTAF, Ne)

using the map shown in FIG. 14B obtained in advance by experiment.

Figure 15A:
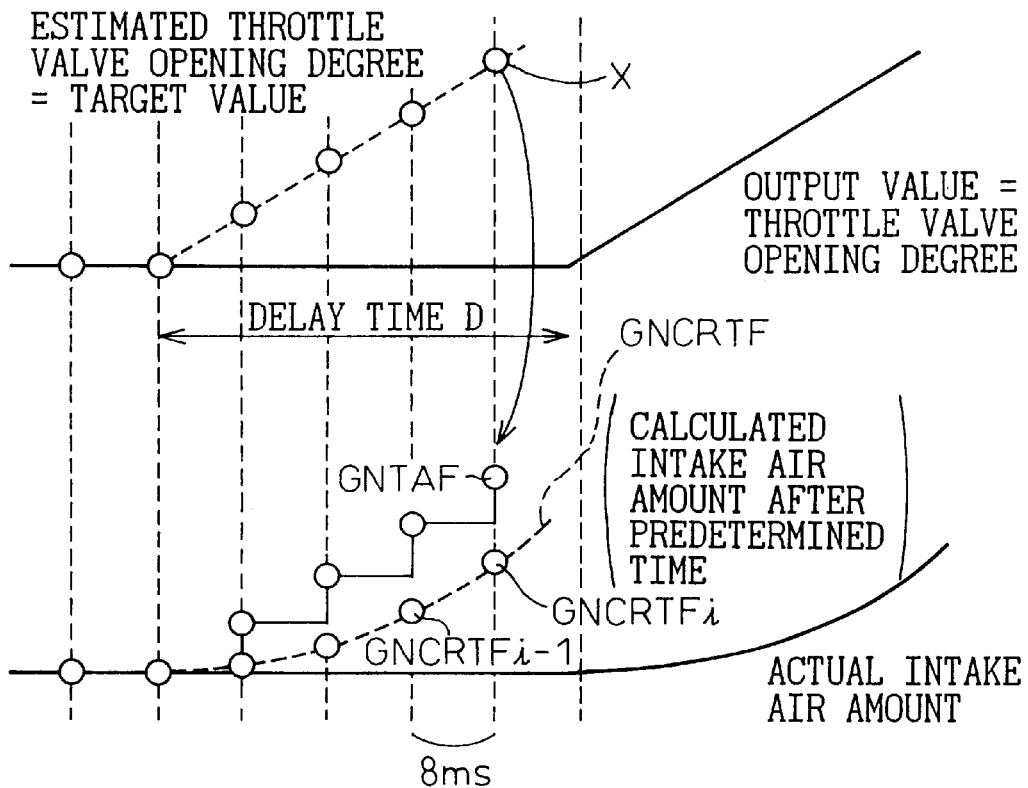
FIG. 15A is a diagram for illustrating the steps of calculating the intake air amount after the lapse of a predetermined time calculated from an estimated opening degree of the throttle valve.
Figure 15B:
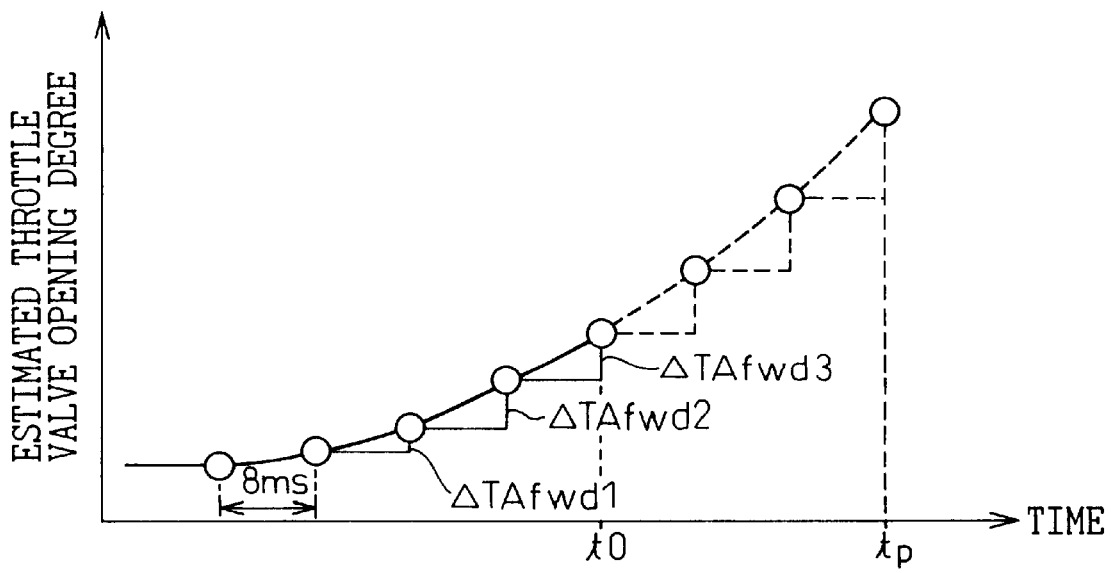
FIG. 15B is a diagram for explaining a method of calculating an estimated throttle valve opening degree at a time corresponding to the timing of closing the intake air valve from the present time.

Step 903 calculates the intake air amount GNCRTFi per engine rotation taking the response delay of the intake air into consideration on the basis of the intake air amount GNTAF per engine rotation in steady state calculated in step 901 and the response time constant TIMCF of the intake air amount calculated in step 702. This calculation is performed as GNCRTFi=GNCRTFi−1+(GNTAF−GNCRTFi−1)×TIMCF FIGS. 15A, 15B illustrate the precess of the above-mentioned calculations. The intervals of the vertical lines shown in FIGS. 15A, 15E represent 8 ms.

As shown in FIG. 15B, assume that the estimated opening degree of the throttle valve increases steadily. Under this condition, assuming that the change in the estimate opening degree of the throttle valve changes constantly, and that the change amounts ΔTAfwd1, ΔTAfwd2 and ΔTAfwd3 of the estimated opening degree of the throttle valve are checked from the third previous data (the data 8 ms×3 before) from the present time t0. On the basis of these data, the change amount of the estimated opening degree of the throttle valve at and after time t0 is estimated. The estimated opening degree of the throttle valve at time point tp can thus be calculated.

The estimated opening degree of the throttle valve at the time point tp can be determined also from the change in the accelerator pedal actuation amount as well as from the change in the throttle valve opening degree. Specifically, the actuation amount of the accelerator pedal at the time point tp is estimated from the data on the third preceding accelerator pedal actuation amount before the present time t0, and the estimated opening degree of the throttle valve can be determined from this estimated accelerator pedal actuation amount.

In FIG. 15A, assume that the dot indicated by character X is an estimated opening degree of the throttle valve at time point tp in FIG. 15B. The intake air amount GNTAF (the intake air amount value ignoring the response delay) per engine rotation shown in FIG. 15B can be determined from the estimated opening degree of the throttle valve at point X. Once the intake air amount GNTAF per engine rotation is determined in this way, the intake air amount GNCRTFi per engine rotation, taking the response delay of the intake air into consideration, is determined as the difference between the intake air amount GNTAF ignoring the response delay and the previous intake air amount GNCRTFi−1 taking the response delay into consideration, multiplied by the response time constant IMCF, plus the previous intake air amount GNCRTFi−1 taking the previous response delay into consideration.

Finally, an explanation will be riven of a method of calculating the time when the fuel injection amount is calculated, i.e., the time TFWD from the present time t0 to the intake air valve closing time T during which the fuel injection is executed. The time length TFWD from the present time t0 to the intake air valve closing time T, as shown in FIG. 12, is the sum of the fuel injection time TAU (ms) and the timing TFWE where the target fuel amount is reached. The fuel injection timing is controlled in such a manner that the timing TFWE when the target Fuel amount has reached assume a predetermined value, say, 260° CA earlier than the intake valve closing time in the internal combustion engine having an electronically-controlled fuel injection apparatus. The timing TFWE can thus be expressed as TFWE=T90×260/90 (ms)

where T90 is the time required for the rotation of 90° in terms of crank angle which is varied with the engine rotational speed Ne, and numeral 260 is the crank angle from the injection timing to the closing of the intake air valve. The time required for rotation of the crank angle from the present time point t0 to the closing of the intake air valve can be calculated by dividing 260° CA by 90° CA, multiplying it by time required for 90° CA rotation, and adding it to the injection time. Actually, however, the fuel transport delay time TB is added to the obtained value TFWD.

As described above, according to the third aspect of the invention, a predetermined delay time is set for controlling the throttle valve opening degree, so that the behavior of the throttle valve opening degree for a predetermined time can be determined Earlier. Also, by determining the air amount required before the closing of the intake air valve, the required amount of fuel to be supplied can be determined, thereby making it possible to accurately control the air-fuel ratio.

What is claimed is:

1. An air-amount-first fuel-amount-second control apparatus an internal combustion engine having a fuel injection cylinder with an air intake valve, an accelerator pedal, and a throttle valve, the apparatus being for controlling the opening degree of the throttle valve and amount of fuel supplied to the fuel injection cylinder in accordance with the operating position of the accelerator pedal, comprising:

throttle valve drive means for driving the operation of the throttle valve in accordance with an input signal;

target throttle valve opening degree calculation means for calculating a target value of the throttle valve opening degree corresponding to the operating position of the accelerator pedal;

throttle valve response characteristic storage means for storing the response characteristic of the throttle valve before reaching a predetermined target opening degree;

intake air valve closing time calculation means for calculating the closing time of the air intake air valve in accordance with the operating condition of the internal combustion engine;

target value reaching time calculation means for calculating the time required for the throttle valve opening degree to reach a target value from said target throttle valve opening value produced by said target throttle valve opening degree calculation means and the value stored in said throttle valve response characteristic storage means;

throttle valve opening degree calculation means for calculating the throttle valve opening degree as of the calculated time of closing the intake air valve from the calculated target value reaching time of the throttle valve and the calculated intake air valve closing time;

fuel supply amount calculation means for calculating the fuel supply amount for a target air-fuel ratio from the ratio between the target air-fuel ratio and the intake air amount corresponding to the throttle valve opening degree as of the time of closing the intake air valve; and fuel supply means for supplying the fuel in said calculated amount.

2. A control apparatus for an internal combustion engine according to claim 1, further comprising:

integral compensation means for subjecting to integral compensation the target throttle valve opening degree input to said throttle valve opening degree calculation means as of said intake air valve closing time.

3. An air-amount-first fuel-amount-second control apparatus for an internal combustion engine having a fuel injection cylinder with an air intake valve, an accelerator pedal, and a throttle valve, the apparatus being for controlling the opening degree of the throttle valve and amount of fuel supplied to the fuel injection cylinder in accordance with the operating position of the accelerator pedal, comprising:

target throttle valve opening degree calculation means for calculating a target value of the throttle valve opening degree corresponding to the operating position of the accelerator pedal;

target throttle valve opening degree storing means for storing the calculated target throttle valve opening degree for a predetermined time;

throttle valve opening degree control value output means for producing the stored target throttle valve opening degree as a throttle valve opening degree control value after the lapse of said predetermined time;

throttle valve drive means for driving the operation of the throttle valve in accordance with said throttle valve opening degree control value;

intake air valve closing time calculation means for calculating the closing time of the intake air valve according to the engine operating condition;

throttle valve opening degree calculation means for calculating the throttle valve opening degree as of the calculated intake air valve closing time from the stored target throttle valve opening degree and the calculated intake air valve closing time of the fuel injection cylinder;

fuel supply amount calculation means for calculating the fuel supply amount for a target air-fuel ratio from the target air-fuel ratio and the intake air amount corresponding to the throttle valve opening degree at said time of closing the intake air valve; and fuel supply means for supplying the fuel in said calculated fuel supply amount.

4. A control apparatus for an internal combustion engine according to claim 3, further comprising:

phase lead compensation means for compensating for the phase lead of the throttle valve opening degree control value produced from said throttle valve opening degree control value output means thereby to compensate for the mechanical delay of the throttle valve operation behind said control value thereby to drive said throttle valve.

5. A control apparatus for an internal combustion engine according to claim 3, further comprising:

integral compensation means for subjecting to integral compensation the target throttle valve opening degree input to said throttle valve opening degree calculation means as of said intake air valve closing time.

6. A control apparatus for an internal combustion engine according to claim 3, further comprising means for storing said predetermined time;

wherein said predetermined time storage means has stored therein a predetermined time longer than the time length from the time point when the fuel injection amount is calculated to the time point of the next closing of the intake air valve of the fuel injection cylinder in accordance with at least the rotational speed of the internal combustion engine, and said throttle valve opening degree control value output means outputs said stored target throttle valve opening degree as a throttle valve opening degree control value after said predetermined time corresponding to the engine rotational speed.

7. An air-amount-first fuel-amount-second control apparatus for an internal combustion engine having a fuel injection cylinder with an air intake valve, an accelerator pedal, and a throttle valve, the apparatus being for controlling the opening degree of the throttle valve and amount of fuel supplied to the fuel injection cylinder in accordance with the operating position of the accelerator pedal, comprising:

target throttle valve opening degree calculation means for calculating a target value of the throttle valve opening degree corresponding to the operating position of the accelerator pedal;

target throttle valve opening degree storing means for storing said calculated throttle valve opening degree for a predetermined time;

throttle valve opening degree control value output means for outputting said stored target throttle valve opening degree as a throttle valve opening degree control value after the lapse of said predetermined time;

throttle valve drive means for driving the operation of the throttle valve in accordance with said throttle valve opening degree control value;

intake air valve closing time calculation means for calculating the closing time of the intake air valve in accordance with the engine operating condition;

first throttle valve opening degree calculation means for calculating the throttle valve opening degree as of the calculated intake air valve closing time of the fuel injection cylinder from said stored target throttle valve opening degree in the case where said predetermined time is longer than said calculated intake air valve closing time;

second throttle valve opening degree calculation means for calculating the change in the throttle valve opening degree during said predetermined time from said stored target throttle valve opening degree and calculating the throttle valve opening degree as of the calculated intake air valve closing time of the fuel injection cylinder on the basis of said change in the throttle valve opening degree in the case where said predetermined time is shorter than said calculated intake air valve closing time;

fuel supply amount calculation means for calculating the fuel supply amount from the target air-fuel ratio and the intake air amount corresponding to the throttle valve opening degree as of said intake air valve inclosing time; and fuel supply means for supplying the fuel in said calculated amount.

* * * * *

UNITED STATES PATENT AND TRADEMARK OFFICE
CERTIFICATE OF CORRECTION

PATENT NO. : 6,014,955
DATED : January 18, 2000
INVENTOR(S) : Ichiro HOSOTANI et al.

It is certified that error appears in the above-identified patent and that said Letters Patent is hereby corrected as shown below:

Claim 1, col. 19, line 31, before "an internal", insert --for--.

Claim 7, col. 22, line 26, "inclosing" should read --closing--

Signed and Sealed this

Third Day of April, 2001

Attest:

NICHOLAS P. GODICI

Attesting Officer     Acting Director of the United States Patent and Trademark Office